June 8, 1965  E. E. MAGAT ETAL  3,188,165
PROCESS FOR GRAFTING AN ORGANIC COMPOUND TO A SHAPED
ARTICLE OF AN ADDITION POLYMER
Filed Aug. 19, 1958
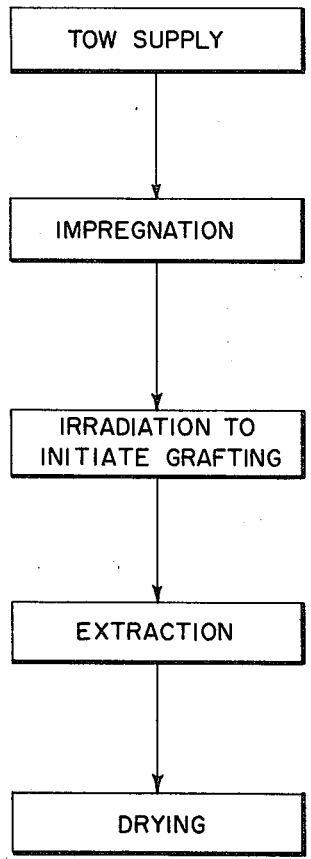
INVENTORS
EUGENE EDWARD MAGAT
DAVID TANNER
BY *Carl A. Hechmer*
ATTORNEY

United States Patent Office 3,188,165
Patented June 8, 1965

3,188,165
PROCESS FOR GRAFTING AN ORGANIC COMPOUND TO A SHAPED ARTICLE OF AN ADDITION POLYMER
Eugene Edward Magat and David Tanner, Wilmington, Del., assignors to E. I. du Pont de Nemours and Company, Wilmington, Del., a corporation of Delaware
Filed Aug. 19, 1958, Ser. No. 756,047
20 Claims. (Cl. 8—115.5)

This application is a continuation-in-part of United States applications Nos. 500,031 and 503,791, filed April 7, 1955, and April 25, 1955, respectively, both now abandoned.

This invention relates to product and process. More particularly it concerns a process for chemically adhering an organic compound to a shaped article produced from a synthetic organic addition polymer and the graft copolymer product formed thereby.

OBJECTS

It is an object of the present invention to provide a process for chemically grafting an organic compound to a shaped article produced from a synthetic organic addition polymer.

Another object is to provide a novel shaped article comprising a solid synthetic organic addition polymer to which an organic compound is grafted.

Another object is to provide shaped articles of a solid synthetic organic addition polymer having new and desirable properties obtained by grafting an organic compound to said shaped article. These new properties are obtained without substantial sacrifice of those properties inherent in the unmodified addition polymer. The modified polymer is thus known as a graft copolymer. More specifically, it is an object of this invention to provide a textile formed from an addition polymer which is freer from static, more dyeable, more resistant to soiling, has improved fiber properties under hot-wet conditions, is more resilient or crease resistant, more flame resistant, and shows better hand and surface lubricity, etc., than textiles heretofore obtainable from the said addition polymer.

It is a still further object of this invention to provide a process whereby a shaped article of addition polymer such as a film or a textile can be modified in its properties, as explained hereinabove, by applying a suitable modifier to the shaped substrate, and inducing chemical bonding therebetween.

A still further object of this invention is to provide a process for modifying a shaped addition polymer throughout its bulk by applying a suitable vinyl monomer to the surface thereof, permitting it to penetrate throughout the substrate, and inducing grafting to said shaped addition polymer.

Yet another object of this invention is to provide a process for modifying a shaped article of synthetic addition polymer by grafting to it a non-polymerizable organic chemical compound.

Still another object of this invention is to provide a process for modifying a textile formed from shaped addition polymer filaments by applying to said textile a highly fluid polymeric material or fluid polymeric solution, coating each filament uniformly and continuously, and inducing chemical bonding therebetween, whereby a surface-modified filament and textile is obtained, which retains the attractive handle and aesthetic properties of the original textile.

These and other objects will become apparent in the course of the following specification and claims.

STATEMENT OF INVENTION

In accordance with the present invention, a novel and useful product is provided by a process wherein a shaped article produced from a synthetic organic addition polymer, in intimate contact with an organic compound, is subjected to bombardment by ionizing radiation to produce chemical bonds between the shaped article and the organic compound. More specifically, an organic modifier is applied to the surface of a shaped article produced from a synthetic organic addition polymer; for deep-seated modification, the organic compound is permitted to diffuse into the substrate, and the shaped article is thereafter irradiated with ionizing radiation to induce chemical bonding. Alternatively, the organic modifier, especially when it is of high molecular weight, may remain upon the surface of the polymer substrate during the irradiation step, thus producing a uniform coating chemically grafted to the polymer substrate. This invention also provides a process whereby a non-polymerizable organic compound may be chemically grafted to a shaped article formed from an organic addition polymer.

DEFINITIONS

By the term "synthetic addition polymer" is meant a polymer which can be formed by vinyl polymerization, i.e., polymerization which proceeds by combination of an unsaturated monomer with itself or with other unsaturated monomers by linkage at the olefinic bonds. Among suitable monomers for such polymerization may be mentioned styrene, the acrylic acid esters, vinyl chloride, vinylidene chloride, vinyl acetate, the vinyl ketones, the vinyl ethers, divinyl ether, the halogen, sulfur, nitrogen and phosphorus containing vinyls, the vinyl silanes, ethylene, propylene, the allyl esters, acrylonitrile, methacrylonitrile, 1,3-butadiene, isoprene, chloroprene, 2,3-dimethyl-1,3-butadiene and the like. Linear, branched, isotactic and atactic polymers are highly suitable. The term comprehends copolymers as well as homopolymers. These polymers are comprehensively discussed by Flory in "Principles of Polymer Chemistry," Cornell University Press, Ithaca, New York (1953). The preferred addition polymers are those which are substantially linear, i.e., those which are produced from predominantly monoethylenically unsaturated monomers. By "substantially" linear is meant that minor amounts of cross-linking or branching may be present (prior to irradiation), provided the polymer exhibits the general solubility and melting characteristics of a linear, as distinguished, from a highly cross-linked polymer. The polymers which are especially preferred are those which are fiber-forming.

By "graft copolymer" is meant a polymer which is modified, after polymerizing and shaping, by chemically bonding thereto, molecules of a chemically dissimilar organic compound.

By "irradiation" is meant the process by which energy is propagated through space, the possibility of propagation being unconditioned by the presence of matter, as distinguished from mere mechanical agitation in a material medium such as is characteristic of energy produced by a sonic or ultrasonic transducer, although the speed, direction and amount of energy transferred may be thus affected.

By "ionizing radiation" is meant radiation having sufficient energy to remove an electron from a gas atom, forming an ion pair; this requires an energy of about 32 electron volts (ev.) for each ion pair formed. This radiation has sufficient energy to non-selectively break chemical bonds; thus, in round numbers radiation with energy of 50 electron volts (ev.) and above is effective for the process of this invention. The ionizing radiation of the process of this invention is generally classed in two groups: high energy particle radiation and ionizing electromagnetic radiation. The effect produced by these two types of radiation is similar, the essential requisite being that the incident particles or photons have sufficient energy to break chemical bonds and generate free radicals.

The preferred radiation for the practice of this invention is high energy ionizing radiation, and has an energy equivalent to at least 0.1 million electron volts (mev.). Higher energies are even more effective; there is no known upper limit, except that imposed by available equipment.

By an "organic compound" is meant a material having the formula $CX_4$ where X is a member of the group consisting of hydrogen, halogen, nitrogen, nitrogen radical, oxygen, oxygen radical, sulfur, sulfur radical or organic radical. By "organic radical" is meant a radical predominantly hydrocarbon except for the presence of substituents immediately hereinbefore listed. Where one or more of the X's is organic radical, it is preferred that it be linked to the CX residue by a carbon-to-carbon bond. Furthermore, the C may be doubly bonded to no more than one $S=$ or $O=$ atom, i. e., only one pair of X's may be replaced by a divalent oxygen or sulfur atom.

Typical compounds included are hydrocarbons, alcohols, acids, ethers, ketones, esters, aldehydes, isocyanates, sulfonates, mercaptans, thioethers, disulfides, nitriles, nitro compounds, amines, amides and halides. Compounds with ethylenic unsaturation are especially preferred, since a minimum radiation dose is required to graft a given weight of modifier.

However, surprisingly, it has been found that non-polymerizable organic compounds (free from aliphatic unsaturation) are also readily grafted, to produce effective modification of polymer properties. Of these compounds, the chain transfer agents are preferred.

Another useful class of modifiers are the high molecular weight compounds, especially polymers. These compounds are readily and effectively grafted since a single site of attachment bonds a relatively large weight of modifier, due to the high molecular weight. The large molecule tends to prevent penetration by these modifiers, and hence they are especially useful in creating surface effects. The polymeric modifiers especially preferred for textile uses are those which may be applied to the textile as a low viscosity fluid, thus ensuring that each filament is completely coated.

DRAWING

The figure is a flow sheet illustrating a typical embodiment wherein the process of the present invention is applied to a yarn or tow, which after impregnation with modifier is irradiated, then washed to remove ungrafted material. The product is then dried, and may be used as continuous filament yarn, or alternatively, it may be cut to form staple fiber which is then spun to yarn and woven to textiles following conventional procedure.

EXPERIMENTAL PROCEDURES AND UNITS

Compositions are given in parts by weight or weight percent, unless otherwise noted.

The irradiation in many of the examples is carried out using a Van de Graaff electron accelerator with an accelerating potential of 2 million electron volts (mev.) with a tube current of 250 to 290 microamperes. Samples to be irradiated are placed on a conveyor and traversed back and forth under the electron beam at a distance of tube window to sample of 10 cm. The conveyor speed is 40 inches per minute. At the sample location the irradiation intensity is 12.5 watt sec./cm.$^2$ of sample which is approximately equivalent to an available dose per pass of one mrad.

Radiation dosages are given in units of "mrad" (millions of rads), a "rad" being the amount of high energy radiation of any type which results in an energy absorption of 100 ergs per gram of water or equivalent absorbing material. Alternatively, dosages may be indicated in terms of exposure in watt seconds per square centimeter of substrate treated.

The "standard washing" to which samples are subjected consists of a 30-minute immersion in 18 liters of 70° C. water contained in a 20-liter agitation washer. The wash solution contains 0.5% of detergent. The detergent employed is that sold under the trademark "Tide" of Procter and Gamble Company of Cincinnati, Ohio. This detergent contains, in addition to the active ingredient, well over 50% (sodium) phosphates (Chemical Industries, 60, 942, July, 1947). Analysis shows the composition to be substantially as follows:

| | Percent |
|---|---|
| Sodium lauryl sulfate | 16 |
| Alkyl alcohol sulfate | 6 |
| Sodium polyphosphate | 30 |
| Sodium pyrophosphate | 17 |
| Sodium silicates and sodium sulfate | 31 |

The static propensity of the fabric is indicated in terms of direct current resistance in ohms per square, measured parallel to the fabric surface, at 78° F. in a 50% relative humidity atmosphere. High values, reported as the logarithm (to the base 10) of the resistivity (log R) indicate a tendency to acquire and retain a static charge.

It should be noted that highly hydrophobic unmodified polymer substrates have such a high resistivity that the log R as determined may depend somewhat on the sensitivity of the meter employed; log R values of 13 to over 15 have been observed, using the same fabric and different meters. However, these differences substantially disappear when a satisfactory antistatic modification is produced, e.g., for log R values of 11 or less. Moreover, data reported in any given example is consistent, i.e., all measurements were made on the same instruments under the same conditions. A meter suitable for this determination is described by Hayek and Chromey, American Dyestuff Reporter, 40, 225 (1951).

Wickability as measured in the examples is determined by placing a drop of water upon the fabric, and measuring the diameter of the wet spot after a standard time interval, e.g., 60 seconds. Alternatively, especially useful where decreased wickability is obtained, is a determination of the length of time required for a drop placed upon the fabric to disappear by soaking into the fabric. Discrepancies observed between control fabrics in the different examples are thought to be due to different preparation techniques. Data within each example are comparable.

Where quantitative values for hole melting are presented, they are measured by dropping heated glass beads of constant weight and diameter from a fixed height from a constant temperature oven onto the fabric. The temperature at which the fabric is stained is called the first damage temperature, and the temperature at which the glass bead melts completely through the fabric is referred to as the hole-melting temperature.

The fiber melt temperature reported in some examples is determined by placing a thread, unraveled from a fabric if necessary, upon an electrically heated tube and observing the tube temperature at which visible melting, fusing of filaments to the tube, or instantaneous decomposition occurs.

Crease recovery is evaluated by crumpling a fabric in the hand, and observing the rate at which it recovers from this treatment. Wet crease recovery indicates the rate and extent of disappearance of creases from the crumpled fabric when it is wetted. Numerical values are obtained using the Monsanto Crease Recovery Method, described as the "vertical strip crease recovery test" in the American Society for Testing Materials Manual, Test No. D1295–53T. In determining wet crease recovery by this method, the specimens are soaked for at least 16 hours in distilled water containing 0.5% by weight of "Tween 20," a polyoxyalkylene derivative of sorbitan monolaurate, a wetting agent marketed by the Atlas Powder Company, Wilmington, Delaware. Immediately prior to testing, excess water is removed from the test fabrics by blotting between layers of a paper towel. Results are reported as percent recovery from a standard crease in 300 seconds.

The wet modulus reported in many of the examples is the slope of the linear initial portion of the stress-strain curve, and has the units of stress required to produce unit elongation. Therefore, it has the dimensions of grams per denier. The magnitude of the initial modulus measured under hot-wet conditions, and indicated by the symbol $M_i$ is of a special significance as a measure of yarn and fabric stability to normal dyeing procedure. It is conventionally measured using an Instron tester, operated at a rate of 60% elongation per minute.

The tensile recovery from a 3% elongation (indicated by the symbol $TR_3$) indicates the percent recovery after a fiber has been stretched 3%. It is determined by stretching a fiber (or yarn) 3% at a rate of 10% elongation per minute; the stretch is held for 30 seconds, then the crosshead of the Instron tester is reversed at the same rate (10%/min.), allowing the fiber to retract, until zero tensile force (less than 0.003 g.p.d.) is indicated. The reported value of $TR_3$ is calculated as follows:

$$TR_3 = \frac{\text{distance recovered}}{\text{distance stretched}} \times 100\%$$

High values of $TR_3$, under warm, wet conditions are desirable since they indicate ability of yarn or fabric to recover from stretching imposed in hot-wet processing, such as in dyeing.

Environmental conditions used in determining $M_i$ and $TR_3$ are indicated in the examples which follow.

The tendency for a fabric to acquire a shiny or glazed appearance when subjected to normal ironing procedures is evaluated by the following test.

A fabric sample is pressed against a smooth platen with a heated 1½ inch diameter steel ram. The load is 9 lbs./in.$^2$, and the duration of the test is 5 seconds. A series of tests is made on a given fabric, at temperatures increasing by 10° C. for each test. The glazed or shiny spot produced at each temperature is compared with a standard; the glazing temperature is that temperature which produces a commercially unacceptable glaze.

Since minor glazing may be removed by steaming the fabric after ironing, it is important to determine the maximum pressing temperature which can be tolerated and still remove the glaze by steaming. This test is carried out by steaming (for 5 seconds, atmospheric pressure) the fabric strip with the glazed spots produced as described above; the temperature used to produce the glaze unremoved by the steam treatment is the glaze removal temperature.

The following examples are cited to illustrated the invention. They are not intended to limit it in any manner. All "parts" referred to in the examples are parts by weight.

*Example I*

Fabric is prepared from conventionally drawn (5.6 draw ratio) polyacrylonitrile copolymer yarn, the copolymer composition being 93.5 parts acrylonitrile, 6 parts methylacrylate, and 0.5 part sodium styrene sulfonate. The fabric is soaked in a solution containing 20 parts acrylamide and 80 parts of water, held at 90–95° C., for 60 minutes. This fabric is then irradiated using two passes under the Van de Graaff electron accelerator, for a dose of 2 mrad. The weight gain, after scouring, is 21%. Physical property measurements on fiber removed from the fabric show a 90° C. wet $M_i$ of 0.6 g.p.d. The grafted yarn has a 50° C. wet $TR_3$ of 27.6%.

A random copolymer fiber control, prepared from the same monomer composition and content as in the first part of this example, with the addition of 20% acrylamide content, (thus having the same nominal composition as the test fabric of this example) has properties as follows:

90° C. wet $M_i$=0.005 g.p.d.
50° C. wet $TR_3$=0 (force too low to measure)

When the test is repeated, merely substituting a 30% aqueous solution of N-vinylpyrrolidone for the acrylamide solution, the weight gain after scouring is 6.7%. The 90° C. wet $M_i$ is 1.0 g.p.d., and the 50° C. wet $TR_3$ is 31%.

*Example II*

A switch of fabric woven from continuous filament polyacrylonitrile is immersed in a solution of 16 parts of polyethylene glycol 20,000 (where the numeral indicates average molecular weight) and 84 parts of water. Excess solution is squeezed from the sample and it is enclosed in an aluminum foil wrapper and thereafter subjected to electron irradiation, furnished by a 1 million electron volt (mev.) resonant transformer with a beam-out current of 560 microamperes. The sample is placed on a conveyor belt which carries it through the electron beam at a rate of 16 inches per minute. The sample is traversed back and forth across the beam until a total dose of 40 mrad is obtained. The sample is then washed thoroughly in hot water containing detergent, rinsed in distilled water and dried. This is followed by two standard washings. The direct current resistance (in ohms) of the sample is then observed, its logarithm being 9.5. After 13 additional consecutive standard washings this value increases to only 9.8. A control sample of the original fabric has a log resistivity of 13.2. A second control sample, immersed in the glycol but not irradiated and thereafter given 15 consecutive standard washings shows no improvement in log resistivity over the original fabric. Cotton, a material with very satisfactory antistatic properties, has a value of 10.8.

*Example III*

A sample of fabric woven from continuous filament yarn produced from polyacrylonitrile is immersed in liquid methoxydodecaethyleneoxymethacrylate and after excess liquid is squeezed out, is enclosed in aluminum foil forming a flat package. An untreated control is similarly packaged. The foil packages are simultaneously irradiated as described hereinafter.

The samples are exposed to X-radiation using a resonant transformer X-ray machine marketed by the General Electric Company, Schenectady, New York, known as a "Two Million Volt Mobile X-ray Unit." This machine is described by E. E. Charlton and W. F. Westendorf in the Proceedings of the First National Electronics Conference, p. 425, October 1944. The packaged samples are placed in a open top box made from 1/16 inch sheet lead, and positioned so that the top sample is 8 cm. from the tungsten tube target. At this location, using a tube voltage of 2 mev. and a tube current of 1.5 milliamperes, the irradiation rate is 1.5 mrad per hour. The beam irradiates a circle about 3 inches in diameter; all fabric tests are made on the irradiated portion. The radiation dose is 28 mrad. Each sample is then given 15 standard washings. The logarithm (base 10) of the resistivity is determined after the fifth washing and after the fifteenth washing. The results are reported in the following table.

TABLE 1

| Sample | Log resistivity after— | |
|---|---|---|
| | 5 washings | 15 washings |
| Treated, irradiated sample | 9.0 | 10.1 |
| Untreated, irradiated control | 13.2 | 13.1 |

A treated but not irradiated swatch of the original fabric has log resistivity of 13.1 and 13.3 after a total of 5 and 15 consecutive standard washings respectively.

*Example IV*

Two samples of fabric woven from staple yarn produced from polyacrylonitrile are immersed in liquid methoxydecaethyleneoxymethacrylate, and after excess liquid is squeezed out, each sample is enclosed in aluminum foil and irradiated with high energy electrons. Sample 4A is given a dosage of 40 mrad. The dosage of sample 4B is 20 mrad. Each sample is then given 15 standard washings. Resistivity is determined after the second washing and after the fifteenth washing. The results are reported in the following table.

TABLE 2

| Sample | Log resistivity after— | |
|---|---|---|
| | 2 washings | 15 washings |
| 4A | 8.5 | 9.3 |
| 4B | 8.9 | 9.5 |

A swatch of the original fabric has log resistivity of 13.1 and 13.3 after a total of 2 and 15 consecutive standard washings respectively. Similarly, an irradiated swatch (dosage of 40 mrad) of the original fabric has a log R of 13.1 and 13.2 after the same washings.

Examples II to IV have shown how the process of this invention is used to produce an antistatic textile fiber from polyacrylonitrile. The antistatic effect is produced by what is believed to be a surface coating of oxygen-containing hydrophilic chains which are grafted to the fiber surface. These hydrophilic grafts provide a high surface conductivity so that static charges can be conducted to ground.

The polyethylene oxide esters of unsaturated acids, as shown in Examples III and IV, are especially effective. In general, it is preferred that from ½ to 5% by weight, based on the weight of the fiber, of such modifiers be grafted to the fiber.

*Example V*

A swatch of fabric prepared from polyvinyl chloride staple is soaked in 25% acrylic acid solution for 12 hours, and is then irradiated to a dose of 2 mrad. After rinsing in 80° C. and distilled water for 1 hour, the weight gain is 0.9%. After exposure to 2% $Na_2CO_3$ solution for 1 hour at 80° C., thus forming the sodium salt of the grafted acid, the log R is 8.7, as compared to 13.5 for an untreated control. When the test is repeated with a swatch of polyacrylonitrile staple fabric, with the exception that the swatch is soaked in the acrylic acid solution for 7 days, followed by an irradiation of 20 mrad, the weight gain is 16%, the log R is reduced from 13.2 (control) to 7.5. The resistance to hole melting is improved from "poor" for the control to "excellent." The test swatch has a fiber melt temperature of over 500° C.

*Example VI*

Samples of polyethylene film, 6D, 6E, 6F, are soaked in acrylic acid and irradiated as shown in Table 3, following the procedure of Example V. The samples are further processed as in Example V, and are tested, with the results listed in Table 3. Control samples 6A, 6B, 6C, which are irradiated but receive no chemical treatments, are included for comparison.

TABLE 3

| Sample | Acrylic soak, days | Radiation dose, mrad. | $Na_2CO_3$ treat. | Log R | Resist. to hole melting | Melt temp., °C. |
|---|---|---|---|---|---|---|
| 6A | None | 2 | None | 13.1 | Poor | 215 |
| 6B | do | 5 | do | 13.1 | do | 215 |
| 6C | do | 20 | do | 13.1 | do | (¹) |
| 6D | 3 | 20 | Yes | 9.0 | Fair | 286 |
| 6E | 13 | 2 | Yes | 8.5 | do | 286 |
| 6F | 13 | 5 | Yes | 7.6 | do | (¹) |

¹ Not determined.

It can be seen that the irradiation alone does not appreciably increase the resistance to hole melting, but that the sodium-acrylate-grafted polyethylene is more resistant to hole melting, and has a significantly higher melt temperature.

Although the acid-grafted product of this invention has been described in terms of grafting of an unsaturated carboxylic acid to the shaped polymeric structure followed by reaction to form the salt of said acid, somewhat similar results are obtained by a one step process in which a preformed organic salt (e.g., potassium acrylate), is grafted in a single operation.

*Example VII*

Polyacrylonitrile filaments are prepared from the copolymer of Example I, which filaments are drawn 5.6×, and are then woven into a taffeta fabric. The fabric is soaked in 20% aqueous acrylic acid at a temperature of 90–95° C. for 60 minutes, and is irradiated using the 2 mev. electron accelerator, to a dose of 2 mrad. Following a standard wash and a rinse in boiling water, the weight gain of the sample is 10%. The physical properties of fibers removed from the sample are tested as in Example I, with the results shown in Table 4. Also included in Table 4 are similar results for filaments removed from a control sample, which had not been irradiation-grafted with acrylic acid, i.e. prepared from a random copolymer with the same overall composition as that of the irradiation grafted product.

TABLE 4

| | Test sample | Control sample |
|---|---|---|
| 90°C. wet modulus, M, g.p.d | 1.37 | 0.1–0.3. |
| 50°C. wet $TR_3$ | 30% | Too low to measure. |

*Example VIII*

A portion of the fabric of Example I is soaked in a solution of 20% acrylic acid in water, at a temperature of 90–95° C., for a period of 30 minutes, and is then irradiated to a dose of 1 mrad. using high energy electrons. During irradiation, the 90–95° C. temperature is maintained. The soaking and irradiation are repeated, and the sample is scoured in "Tide" solution at the boil. After drying, a weight gain of 10% is noted. Physical properties of the fiber removed from the fabric are as follows: 90° C. wet modulus, 1.1 g.p.d., 50° C. wet $TR_3$, 27%.

After treating the acrylic acid-modified test fabric modified with 0.5% aqueous sodium carbonate at the boil, the fabric shows a 73% wet crease recovery at 50° C., as compared to 35% for an unmodified control fabric. When an attempt is made to repeat the sodium carbonate treatment on a fabric prepared from a random copolymer of the same overall composition as the irradiation grafted product, the fabric disintegrates in the boiling sodium carbonate solution.

When methacrylic acid is used in place of acrylic acid, similar results are obtained.

*Example IX*

A swatch, 9A, of the original fabric employed in Example II is heated at 95° C. in a solution containing 50 parts of crude sodium styrene sulfonate and 50 parts of water. It is then enclosed in a polyethylene film wrapper and is thereafter irradiated with the equipment and in accordance with the technique of Example II to a total dosage of 40 mrad. The sample 9A has a log R of 11.7 after being subjected to 15 consecutive standard washings; a non-irradiated control, 9B, subjected to the same treatment, has a log R greater than 13.3.

The test is repeated, using a swatch, 9C, of the copolymer fabric of Example I. The fabric swatch is soaked in a solution of 30% sodium styrene sulfonate in water, at 95° C. for 20 minutes. The fabric is irradiated, while wet, to a dose of 2 mrad. Analysis shows a total sulfur content corresponding to 10% (based on fabric weight) of sodium styrene sulfonate grafted. After drawing 4×, the physical properties of this fiber are 90° C. wet modulus, 0.7 g.p.d.; 50° C. wet $TR_3$, 25%.

A control, 9D, is prepared by making a copolymer from the following monomer mixture: acrylonitrile, 93.5 parts; methyl acrylate, 6 parts; sodium styrene sulfonate, 10.5 parts; the copolymer composition thus corresponds to 9C. Filaments from this polymer are spun and drawn, following the same procedure used for 9C. However, these filaments from the random copolymer have a 90° C. wet modulus of only 0.1 g.p.d., and a $TR_3$ which is too low to measure. This shows that the graft copolymer filaments of 9C have highly superior hot-wet properties, as compared to the conventional copolymer 9D.

The procedure for sample 9C is repeated, using a tow of continuous filament of the copolymer of Example I. The tow is soaked in aqueous sodium styrene sulfonate at 95° C. passing through the bath in a sinuous path so that the exposure time is 20 minutes. The tow then passes under the electron beam at a rate such that the irradiation dose is 2 mrad. The tow then passes through an extraction step where ungrafted homopolymer and unreacted monomer are removed. The tow is then dried, and cut to staple. The staple is processed on conventional spinning equipment to a No. 10 cotton count yarn. The yarn is knitted to fabric which is found to be highly antistatic.

*Example X*

A series of fabrics prepared from polymers produced from the monomers indicated in Table 5 are soaked in a 20% aqueous solution of acrylic acid for a period of 30 minutes at a temperature of 90–95° C., except for sample 10F (polyethylene filaments), which is soaked in a solution of 20% acrylic acid and 80% isooctane at 50° C. The samples are irradiated at the soaking temperature to acquire a dose of 1 mrad. Each fabric is then washed in hot distilled water at 80–90° C. four times, in a washing machine, to remove ungrafted material. The observed weight gain is indicated in Table 5. Each sample is converted to the sodium salt form of the grafted acrylic acid by boiling for 10 minutes in a 1% solution of sodium carbonate. The log R is determined on the sodium salt form; a reduced static propensity is noted. The log R of all the fabrics before grafting was greater than 13.3.

Sample 10E showed improved wet crease recovery, increasing from 60 for control to 90% for 10E.

TABLE 5

| Sample | Monomers used in preparation of substrate | Soak temp., °C. | Weight gain, percent | Log R |
|---|---|---|---|---|
| 10A | Vinyl chloride/acrylonitrile | 90–95 | 4.4 | (1) |
| 10B | Acrylonitrile/vinyl pyrrolidone | 90–95 | 12.8 | 9.6 |
| 10C | Vinyl chloride | 90–95 | 5.8 | 9.6 |
| 10D | Vinylidene chloride/vinyl chloride | 90–95 | 2.2 | 12.9 |
| 10E | Acrylonitrile/vinylidene chloride | 90–95 | 14.8 | 7.5 |
| 10F | Ethylene | 50 | 6.9 | 8.5 |

[1] Not determined.

*Example XI*

A swatch of polyacrylonitrile fabric is heated at 95° C. for ½ hour in an aqueous solution containing 20% of acrylic acid and 20% of crude sodium styrene sulfonate. The sample is irradiated while wet and hot with 2 mev. electrons, using a dose of 1 mrad. After washing to remove homopolymer, the weight gain is 12.8%. After converting to the sodium salt by boiling in dilute sodium carbonate, the log R is found to be equivalent to that of cotton at 20% R.H.

*Example XII*

A 1.25 gram package of linear polyethylene fiber drawn 10×, is coated with molten maleic anhydride. The anhydride solidifies on the fiber, when cooled to room temperature. The fiber sample is irradiated in air, using 2 mev. electrons to a total exposure of 26 mrad. The yarn package is then washed in a large volume of water at 80° C. for two hours, and then in a dilute solution of "Tide" detergent for one hour. The dried sample exhibits a weight gain of 3.2%. When dyed with a basic dye, Victoria Blue (C.I. Basic Blue 26) it acquires a deep shade. The dye is fast to laundering in dilute aqueous "Tide" at 70° for one hour. A non-irradiated control is virtually undyeable and exhibits a weight gain, following the maleic anhydride treatment, of only 0.8%.

*Example XIII*

A film of branched polyethylene, 5 mils thick, is coated with maleic anhydride as described in Example XII. The film is irradiated with 2 mev. electrons to a total exposure of 18 mrad. After extraction treatments similar to Example XII, the film shows a weight gain of 2.34%. When dyed with Victoria Blue, an intense blue shade is obtained. A non-irradiated control exhibits a weight gain of 0.02%, and is not dyed by the basic dye.

*Example XIV*

A portion of the original polyvinyl chloride fabric used for sample 10C (Example X) is soaked in a 20% solution of acrylic acid dissolved in dioxane, for 2 hours at room temperature. The sample is then wrapped in aluminum foil and irradiated to a dose of 1 mrad. After washing, the weight gain is 4.9%, and the sample is substantially white in color, and does not require bleaching. In contrast, using aqueous acrylic acid solution in treating sample 10C (i.e., no dioxane solution present during irradiation) the sample acquires a yellow hue which requires bleaching. Similarly improved whiteness is noted when dioxane solutions of acrylic acid are used to treat polyacrylonitrile filaments.

The preceding examples (Examples V to XIV) have shown a process whereby an unsaturated organic acid is grafted to an addition polymer substrate. The product formed thereby may be converted to a salt by contacting with an appropriate solution containing positive ions. The acid-grafted polymer substrate is characterized by deep dyeability with basic dyes; the product in the form of a salt in some cases (e.g., calcium salt) has greatly increased resistance to hole melting; with other cations (e.g., sodium), the acid-grafted substrate is highly antistatic, hydrophilic, and is readily dyeable.

By an "unsaturated organic acid" as used herein is meant any acid and/or anhydride which contains at least one reactive aliphatic unsaturated bond. It is preferred that it be of relatively low molecular weight since for most purposes it is desirable that the acid penetrate into the shaped article and low molecular weight acids more readily penetrate the polymer structures. Thus, acids with up to 8 carbon atoms are preferred. However, acids with as high as 20 carbons in chain length may be used. For maximum activation of the double bond, it is desirable that it be in close proximity to the carboxyl group, which also appears to enhance the rate of penetration of the agent into the fiber. Suitable unsaturated monoacids are acrylic, methacrylic, ethacrylic, crotonic, propiolic, and styrene carboxylic acids, for example. To produce a slightly different effect, those unsaturated acids which are difunctional are highly useful. Examples of these are maleic, dichloromaleic, difluoromaleic, fumaric, butadiene dicarboxylic and itaconic acids. In addition to the acids, other derivatives such as acid chlorides, acid anhydrides, half acid esters, and half acid amides are also effective.

Any organic compound with aliphatic unsaturation, containing functional groups which are convertible to the acid form by hydrolysis (e.g., amides, esters, nitriles), oxidation (e.g., aldehydes or ketones) or the like is suitable. The unsaturated acid may also contain substituent groups which it may be desirable to attach to the polymer to confer other properties, such as enhanced static reduction, moisture repellence, dyeability, flame-proofness, etc. The said substituent groups may also be introduced by copolymerizing or co-grafting suitable monomers with the unsaturated acid.

In addition to the unsaturated carboxylic acids, other acids are useful. Such acids are the sulfonic acids (e.g., styrene sulfonic acid, ethylene sulfonic acid), unsaturated alkyl or aralkyl acid phosphates, phosphites, phosphonates, and phosphinates; acid alkyl sulfates and carbonates with unsaturated carbon-carbon bonds also have utility. Substituted acid phosphinate derivatives have especial utility because they also improve oxidation resistance. It is sometimes convenient to graft the acids in the form of their preformed metal salts.

Mixtures of unsaturated acids as well as the penetration and grafting of one acid followed by the penetration and grafting of other acids are obvious technique modifications.

Due to the attachment of the unsaturated acid, the polymer becomes highly receptive to basic dyes. Cross sections of acid treated, grafted filaments dyed with basic dyes show deep dyeing throughout the fiber, proving that the acid has penetrated into the fiber before grafting.

When experimental conditions are adjusted so that complete penetration does not occur, microscopic examination of the dyed filament cross section shows a sharply defined ring which clearly defines the depth of penetration. For some purposes limited penetration is desirable.

The preferred substrate to which the acid modifiers as defined hereinabove may be grafted are those which are prepared from homopolymers and copolymers of acrylonitrile. Such polymers having 70% or more acrylonitrile are especially preferred. The preferred physical form of the substrate is that of a fiber, filament, or fabric or pellicle.

In addition to the above, the process of this invention is highly useful in preparing a flame-retardant textile. Such a textile may be of woven, knit or pile construction, as illustrated by the following examples.

*Example XV*

A small piece of a tufted cut-pile rug prepared from polyacrylonitrile fiber, containing 30 ounces of fiber per square yard of rug, and tufted to a cut-pile thickness of $7/16''$, is steeped at 25° C. in an 80% aqueous solution of acetonitrile for 1 hour. The excess liquid is allowed to drain off, and an amount of bis(chloroethyl) vinyl phosphonate equal to about 10% of the dry fiber weight is applied uniformly over the pile surface and allowed to soak in. The wet rug is irradiated in the 2 mev. Van de Graaff electron generator for a total dose of 5 mrad. The sample is then extracted with methyl alcohol, dried, and scoured at the boil in a ¼% "Tide" detergent solution, to remove ungrafted material. A chlorine analysis of the modified fiber indicates a weight gain of 4.1% due to the grafted chloroethyl phosphonate.

The sample is tested for flame resistance by the following procedure. The rug sample is dried thoroughly by conditioning for 24 hours at 0% R.H., 70° C., and is then placed in a draft-free dry box. A pellet of hexamethylene tetramine, with a burning time of 100 seconds, is placed on the sample and ignited. The rug does not support combustion after the pellet burns out, and shows only a charred spot where it is touched by the flame. A control sample, similarly treated but not irradiated, burns vigorously and the sample is completely consumed. A second control sample, which had been subjected to irradiation but without the phosphonate treatment, also burns completely.

Following the above procedure, a series of carpet samples having polyacrylonitrile pile with a conventional jute backing are heated at 100° C. and 120° C. for ½ hour in pure bis-(β-chloroethyl) vinyl phosphonate, and are then irradiated with the dose shown in Table 6. They are then extracted twice in hot methanol, dried and weighed. Weight gains are listed in Table 6, based on the total weight of carpet sample which includes jute backing. Samples of the polyacrylonitrile pile fiber are analyzed for phosphorus content with the results also shown in the table. Results are reported as percent modifier; also the table lists the amount of phosphorus and chlorine actually incorporated. From the results reported, it is obvious that the major portion of the modifier grafted to the carpet is attached to the jute backing. However, testing for flame resistance by the procedures described hereinabove shows a rating of fair to excellent for the four samples. Thus, relatively minor amounts of the compound grafter to the pile are required to prevent it from burning.

TABLE 6

| Sample | Soak. temp., ° C. | Dose, mrad. | Percent weight gain, carpet basis | Based on pile weight | | | Flame resistance |
|---|---|---|---|---|---|---|---|
| | | | | Percent modifier | Percent phosphorus | Percent chlorine | |
| 15A | 100 | 10 | 10.0 | 2.46 | 0.33 | 0.75 | Excellent. |
| 15B | 120 | 10 | 10.2 | 1.31 | 0.17 | 0.40 | Do. |
| 15C[1] | 100 | 10 | 11.1 | 1.9 | 0.25 | 0.58 | Do. |
| 15D | 100 | 5 | 8.9 | 1.1 | 0.15 | 0.33 | Fair. |

[1] Treating solution contained 45 ml. of the phosphonate compound and 4 gm. of acrylamide.

*Example XVI*

A swatch of polyacrylonitrile fabric is soaked in liquid diallyl benzene phosphonate for 30 minutes at 90–95° C., and is then irradiated at this temperature with 2 mev. electrons to a dose of 10 mrad. After extracting nongrafted homopolymer, a weight gain of about 2% is obtained.

When the sample is again treated as above, the weight gain due to grafted diallyl benzene phosphonate increases to a total of 5.1%. When the treated sample is ignited while lying on a flat surface, it burns slowly at the edge and then the flame extinguishes itself. Under these conditions, the untreated fabric burns vigorously until it is completely consumed.

*Example XVII*

Two portions of polyacrylonitrile knit tubing are swollen by soaking for 15 minutes at 50 to 60° C. in a solution of 80 parts acetonitrile and 20 parts of water. Thereafter, the samples are soaked in pure inhibitor-free vinylidene chloride for 1 hour at 95° C. and the samples are then irradiated at 95° C. with 2 mev. electrons in the presence of the soaking solution. Sample 17A is irradiated to a dose of 5 mrad, and sample 17B to a dose of 10 mrad. Following the irradiation, the samples are extracted with hot methanol and then tetrahydrofuran, in order to remove any ungrafted material. The samples are then dried and weighed, and sample 17A shows a weight gain of 4.5%, sample 17B a weight gain of 7.6%. Both samples show a greatly decreased rate of burning when ignited, as compared to an untreated non-irradiated control.

The procedure of Example XV is repeated, using a rug with 5/16" pile height, and replacing bis(chloroethyl) vinyl phosphonate with vinylidene chloride. After final extraction, the pick-up of grafted material is 11.3%, based on total rug weight. When ignited as in Example XV, the grafted rug sample burns noticeably more slowly than the untreated control. When extinguished after a burning time of 90 seconds, the treated rug has burned at a rate of 14 sq. cm./min., while the untreated rug has burned twice this fast, 29 sq. cm./min.

The flame-resistant textiles from polyacrylonitrile or polyacrylonitrile copolymers, which are disclosed in the preceding examples, are rendered flame resistant by grafting polymerizable unsaturated compounds within the surface layers of the filaments. When the modifiers grafted to the fabric are chlorinated compounds, sufficient modifier should be grafted to incorporate at least about 10% chlorine, and preferably 14% chlorine. For phosphorus-containing modifiers, sufficient modifier should be grafted to incorporate at least about 0.5% phosphorus. Either of these elements gives the desired effect, but they may also be advantageously combined in the same molecule, or may be applied to the fiber as mixtures and cografted. Improved grafting is usually noted if the fiber is swollen (e.g., with acetonitrile) before or during application of the monomer, but it is usually unnecessary for the modifier to penetrate deeply into the fiber in order to affect the burning rate.

Useful halogenides for imparting flame resistance include alkenes with halogen (especially chlorine) substituents, such as, for example, vinylidene chloride; unsaturated derivatives of halogenated cyclopentadiene, such as the product derived from hexachlorocyclopentadiene and divinyl ether, and the like.

Suitable phosphorus-containing compounds are alkyl phosphonic acids having unsaturation in the alkyl groups, such as, for example, propenyl-2-phosphonic acid; esters from phosphoric acid and unsaturated alcohols, such as triallyl phosphate; esters from alkyl phosphonic acids and alcohols in which at least one of the alkyl groups of ether the acid or the alcohol is unsaturated, such as diallyl benzene phosphonate, diethyl allyl phosphonate; acids and esters of the above types which include one or more halogen atoms in the alkyl groups, such as bis-($\beta$-chloroethyl) vinyl phosphonate. In addition, esters from 1-ketophosphonic acids with alcohols in which at least one alkyl group is unsaturated such as diethyl acrylyl phosphonate, diethyl methacrylyl phosphonate and the like are useful. Other compounds of the above classes are useful, wherein the ester groups —P—OR are replaced partially or entirely with amide groups —P—$NH_2$, —P—NHR or —P—$N(R)_2$. Analogous phosphinate compounds, in which the phosphorus is in a different state of hydration, are also useful.

The process of the instant invention is highly useful in modifying textile fibers from acrylonitrile polymers and copolymers to improve softening temperature, resistance to glazing, and increasing resistance to deformation at high temperatures and under wet conditions such as encountered in laundering. Improved recovery from deformation under steam processing is often obtainable. Such modification is shown in the following example.

*Example XVIII*

Polyacrylonitrile fibers (intrinsic viscosity of 2, measured in dimethylformamide) are dry spun from dimethylformamide, and water extracted. While in the undrawn condition, the filaments are steeped for 30 minutes at 65–70° C. in a solution containing 10 grams of acenapthylene in a mixture of 70 ml. acetonitrile and 30 ml. of water. The filaments are then squeezed to remove excess liquor and are irradiated with 2 mev. electrons at the soaking temperature with a total dose of 1 mrad. The acetonitrile component of the soaking solution serves as a swelling agent for the fiber and also as a solvent for the monomer, thus improving the penetration. The irradiated, grafted fibers are scoured by boiling in an aqueous solution of "Tide" detergent, are dried and then extracted with refluxing benzene to remove non-grafted acenaphthylene polymer. The permanent wash-fast weight gain is 9.3%. After drawing the filaments four fold in boiling water, they have the properties listed in Table 7. Properties of a control fiber which was similarly treated except for the steeping and irradiating steps, are also included for comparison.

TABLE 7

|  | Acenapthylene graft fiber | Unmodified fiber (control) |
|---|---|---|
| Tenacity (g.p.d.) | 2.5 | 2.3 |
| Elongation at break | 28 | 26 |
| Initial modulus, $M_i$, at 70% RH (g.p.d.) | 49 | 40 |
| $M_i$ in 90° C. water (g.p.d.) | 10 | 3 |
| Fabric tests: |  |  |
| Glaze temperature (° C.) | 155 | 80 |
| Temp. below which glaze may be removed by steampress technique, degrees | >160 | 105 |

Modifiers suitable for imparting improved thermal properties to addition polymer substrates, especially substrates of polyacrylonitrile, are those vinyl compounds which, as homopolymers, have softening temperatures of at least 100° C., and preferably above 150° C. The softening temperature is suitably measured by any of the standard methods for determining second order transition temperature ($Tg$), for example, by dilatometry. A particularly suitable method is to determine the temperature at which there is a minimum in the force-temperature curve, by the following procedure: a fiber or film of the homopolymer to be tested is extended from 3 to 5% in length in the jaws of a standard tensile testing machine, and is held at a temperature substantially higher than the approximate softening temperature of the sample, as determined by simple observation, for a few minutes until the initial stress has decayed to a fairly constant level. The environmental temperature is now lowered, and the stress in the sample is plotted as a function of that temperature. A minimum stress marks the softening temperature; this is the temperature useful in determining suitability of the monomer for improving high temperature properties of polyacrylonitrile fiber. As an example, the acenapthylene used in Example XVIII forms a homopolymer which has a high softening temperature, above 280° C.

To develop these fiber properties, which lead to greater ease of care in fabrics, from 3 to 20% of the modifier should be grafted. Deep penetration is desired in order that as much of the fiber structure as possible be reinforced by the grafted modifier.

The effects produced by these modifiers may be supplemented by compounds which have other functional groups to contribute additional properties; for example, hydrophobic structures will predominantly favor higher glaze temperature and resistance to wet deformation, whereas a more hydrophilic substance of the same high softening temperature (as measured dry) may provide, in addition to freedom from glazing, greater accessibility of the fiber to dyes, greater moisture absorption, and greater recovery from deformation during steam pressing.

Especially useful monomers are those vinyl compounds having a high second order transition temperature (Tg) through rings attached to the vinyl group, e.g., N-vinyl carbazole (Tg=210° C.), N-vinyl succinimide (Tg=210° C.), N-vinylcaprolactam (Tg=180° C.). Another useful class comprises those which give polymers having a ring-in-chain structure; such monomers are represented by acenaphthylene, N-phenylmaleimide, N-methylmaleimide softens 205° C. as a 1:1 copolymer with acrylonitrile, and the like. In general, high-melting mono-ene and diene monomers are useful; examples are 2,3-dimethylenedecaline (M.P. 203° C.), indene, indone (M.P. 305° C.), 1,4-dihydronaphthylene, and 3-methylenephthalide (M.P. >300° C.). A third useful class are the non-conjugated dienes, especially those which polymerize by intramolecular addition to give chains including 6-membered rings, e.g., 2,6-dicarbomethoxyheptadiene-1,6 (M.P. 240 as homopolymer); 2,6-dicyanoheptadiene-1,6 (M.P. >300 as homopolymer).

A fourth class of vinyl monomers which may be usefully employed are those which contain crystallizable side groups such as, for example, N-(4,N'-cyclohexylbenzamide)acrylamide, N(4 - N'-cyclohexylbenzanilide)-acrylamide, N(4-N'-methylbenzanilide)acrylamide (M.P. >300° C.), and N(4'-sulfanilphenyl)acrylamide.

Hydrophilic modifications of the above monomers are prepared by incorporating suitable hydrophilic groups on the monomer molecule; for example, substituents with sulfonic or carboxylic groups may be reacted with acenaphthylene to serve this purpose.

For use in luxury sweaters, it is often desirable to impart to a staple fiber a cashmere-like hand. Most synthetic fibers do not have this hand, thus limiting their use in the particular market. Attempts have been made to improve the slickness to provide a cashmere-like hand by applying various modifiers that give lubricity to the fiber surface. Unfortunately, such treatments have, in the past, not been found permanent to washing. By the process of this invention, it is possible to chemically bond suitable modifiers to the fiber surface so that surface lubricity (slickness) is permanently improved. Thus, fabrics prepared from this modified staple acquire a softer, more cashmere-like hand.

The difference between a slick fiber such as, for instance, cashmere and, for example, polyacrylonitrile fiber, is very striking, and it is readily apparent to a customer who handles the article. Unfortunately, no reliable measure of this property has been discovered. Therefore, in evaluating modifications, it has been found necessary to resort to subjective tests wherein samples are rated according to degree of slickness or acquisition of the cashmere-like hand. The preparation of such samples is shown by the following example.

*Example XIX*

A swatch of continuous filament fabric of the acrylonitrile copolymer of Example I is soaked in 20 ml. of freshly distilled octyl acrylate at 90° C. for 30 minutes, and is then irradiated at this temperature with 2 mev. electrons for a dose of 3 mrad. After extracting in refluxing methylethyl ketone, then in dioxane, the observed weight gain is 2.7%. Repeated washing in methylethyl ketone, and in "Tide" solution, produced no further weight loss.

When the test is repeated, using a portion of card sliver having the same polymer composition, the staple sample has a greatly improved surface lubricity or slickness, as compared to a non-irradiated, treated control, by subjective rating.

Monomers useful for producing the improved slickness in spun yarn fabrics are those which have alkyl chains of 8 or more carbon atoms. Chains as long as 18 carbon atoms are effective. The alkyl groups required for improving lubricity and vinyl groups desirable for efficient grafting are suitably connected by ester or amide linkages; thus, useful compounds are long-chain alkyl esters or N-alkyl amides of acrylic or methacrylic acids. Suitable examples are octyl acrylate or N-dodecylacrylamide. Obviously, derivatives of other unsaturated acids may also be used. In general, it is desirable to graft on from about ½ to about 5% of the modifier to obtain useful improvement in slickness.

*Example XX*

A fabric of polyacrylonitrile staple is heated at 95° C. for ½ hour in 20% aqueous acrylamide, and is irradiated at that temperature to a dose of 1 mrad. After washing in distilled water at 80° C., the weight gain, due to grafted polyacrylamide, is 9.8%. This fabric is then heated in a 30% aqueous solution of a 50/50 molar mixture of quaternized 2-dimethylaminoethyl methacrylate and purified sodium styrene sulfonate for ½ hour at 95° C., followed by irradition at this temperature to a dose of 1 mrad. After washing to remove ungrafted homopolymer, the weight gain is 18.5%.

*Example XXI*

A sample of polyacrylonitrile continuous filament fabric is soaked for 30 minutes at 95° C. in an aqueous solution containing 5% bis-methylene acrylamide. The sample is then irradiated with 2 mev. electrons, using a dose of 1 mrad. After the unattached polymer has been extracted, the sample shows a weight gain of 3.0%. Fibers with grafted bis-methylene acrylamide showed a significant improvement in liveliness as compared to an untreated irradiated control.

*Example XXII*

A sample of butadiene-acrylonitrile elastomer copolymer is soaked in methyl metharcrylate monomer for 30 minutes at 80° C., and is then irradiated with 2 mev. electrons using a dose of 3 mrad. After extracting un-attached homopolymer, a weight gain of 4.3% is observed. On treatment with dilute alkali, the polymethyl methacrylate graft is 65% saponified to sodium acrylate. The product is more wettable with water than an unmodified control.

When the test is repeated using chloro-sulfonated polyethylene, a weight gain of 8.7% is noted. Following the caustic treatment, the polymethyl methacrylate is 12% saponified to sodium acrylate.

*Example XXIII*

A series of samples of polypropylene film (0.005" thick) are soaked in solutions of acrylic acid in cyclohexane of varying compositions, and are then irradiated as described above to a dose of 2 mrad. Ungrated homopolymer is extracted, and the weight gain of each sample is determined, with the results shown in Table 8. Portions of each sample are used to determine zero strength temperature and the log R, with the results indicated. For comparison, the zero strength temperature (ZST) of an unmodified control, 23D, is 154° C., and has a log R of 13.7.

Portions of samples 23A to 23C are converted to the sodium salt form by boiling in 1% sodium phosphate solution, and the zero strength temperature and log R are determined. A third portion of each acid grafted sample is converted to the calcium salt form by boiling in 1% calcium chloride for ½ hour; a zero strength temperature and log R are determined as before, and are listed in Table 8.

TABLE 8

| Sample | Weight gain, percent | Acid | | Sodium salt | | Calcium salt | |
|---|---|---|---|---|---|---|---|
| | | ZST | Log R | ZST | Log R | ZST | Log R |
| 23A | 26 | 212 | 13.0 | 217 | 8.0 | 224 | 12.9 |
| 23B | 20 | 254 | 13.0 | 229 | 7.8 | 235 | 12.3 |
| 23C | 18 | 221 | 12.6 | 265 | 8.1 | 222 | 12.4 |

Example XXIV

A film of polypropylene 0.005" thick is soaked in a mixture of N-methyl-N-vinylformamide and a little benzene, wrapped in aluminum foil while wet, and heated at 70–90° C. for 30 minutes. It is then irradiated with 2 mev. electrons for a total dose of 10 mrad. After extracting to remove the ungrafted homopolymer, a weight gain of 46% is observed. The log R is 12.9, as compared with the log R of 13.7 for an ungrafted control. The modified film swells readily in water, and the surface becomes slippery. It is also readily dyeable and printable.

Example XXV

Sample 25A of polyethylene film, and sample 25B, of polypropylene film, are soaked in separate 30 ml. portions of a solution of 50 parts N-vinylpyrrolidone, 50 parts n-heptane. Two drops of water are added to each solution; the samples are heated for ½ hour at 55° C., then irradiated at this temperature, using 2 mev. electrons to a dose of 3 mrad. The samples are rinsed in water, then in acetone followed by extraction in a Soxhlet overnight, using methanol as solvent. After drying, sample 25A shows a weight gain of 24.2%, sample 25B, 7.4%. The samples are dyed separately, along with unmodified controls, in baths of the following composition:

0.01 gm. of the cobalt complex dye (red) of Example III of German Patent 743,155 (1943)
0.01 gm. of the sodium salt of an unsaturated long-chain alcohol sulfate
0.01 gm. ammonium sulfate
50 gm. water The samples were dyed for 30 minutes at the boil. Sample 25A acquires a very deep shade of red, sample 25B acquires a medium shade. Neither control is colored.

The above procedure is repeated, by soaking 100 gm. of powdered linear polypropylene in 200 ml. of the above solution, at a temperature of 95° C. After irradiation as before, the powder with grafted N-vinylpyrrolidone is boiled in 15 liters of distilled water, filtered and air-dried. The powder is next Soxhlet-extracted overnight with methanol, and dried. The yield is 124 gms., equivalent to a weight gain of about 24%.

Example XXVI

A swatch of fabric prepared from polyacrylonitrile staple fiber is soaked in a solution of 30 parts maleic acid, 70 parts decaethyleneoxymethacrylate, and 100 parts water at a temperature of 90° C. for 30 minutes. The soaked sample is irradiated to a dose of 40 mrad., followed by 15 standard "Tide" washings. The log R is found to be 11.7, as compared to a value of 13.3 for an irradiated untreated control. A second sample of the above fabric is soaked in 33% aqueous propiolic acid, similarly irradiated, and then washed to remove homopolymer. After one standard washing, a weight gain of 1.7% is observed.

Example XXVII

A swatch of fabric woven from continuous filament polyacrylonitrile is treated with liquid dodecafluoroheptyl alcohol. After excess liquid is squeezed out, the sample is enclosed in aluminum foil and thereafter irradiated with the equipment and in accordance with the technique of Example I to a total dosage of 37 mrad. This sample is then subjected to 15 consecutive standard washings. After being rinsed and dried, the sample is tested for ease of wetting by placing a drop of water on the dry fabric and measuring the diameter of the wet spot after 60 seconds. For the swatch treated as described above, the wet spot measures 0.3 inch after 60 seconds. This compares with a wet spot of 1.8 inches on the original fabric after the same time interval. The grafted test fabric is also more oil repellent than the original fabric. A control treated with the fluoro-alcohol but not irradiated and thereafter given 15 consecutive standard washings shows no improvement in water or oil repellency over the original fabric.

Example XXVIII

A swatch of fabric woven from continuous filament polytetrafluoroethylene is immersed in liquid methoxydecaethyleneoxymethacrylate. After excess liquid is squeezed out, it is enclosed in aluminum foil and thereafter irradiated with the equipment and in accordance with the technique of Example I to a total dosage of 17 mrad. The sample is subjected to 15 consecutive standard washings. Its log resistivity is observed to be 10.2. This compares to a value of 13.5 for the original fabric after similar irradiation.

Example XXIX

A swatch of the original fabric employed in Example XXVIII is wetted by immersion in a solution of 16 parts polyethylene glycol 20,000 and 84 parts of water. The wetted fabric is then enclosed in aluminum foil and thereafter irradiated with the equipment and in accordance with the technique of Example I to a total dosage of 37 mrad. After 15 consecutive standard washings, the log resistivity of the sample is 9.3. The log resistivity of the original sample is 13.5 after 15 consecutive standard washings.

Example XXX

Five cubic centimeters of liquid methoxydecaethyleneoxymethacrylate is placed in an envelope of polyethylene film. The envelope is sealed and thereafter irradiated with the equipment and in accordance with the technique of Example II to a total dosage of 37 mrad. The envelope is then opened and excess organic compound is removed. The envelope is subjected to 15 consecutive standard washings. Its log resistivity is observed to be 10.1. The original polyethylene film has a log resistivity of 12.7.

Example XXXI

This example illustrates a method of applying a scratch resistant coating in accordance with the present invention. A mixture of 15 parts (by weight) of monomeric allyl methacrylate, 5 parts benzoyl peroxide and 80 parts of acetone are refluxed for three hours at about 60° C. To this mixture is added 180 parts of methyl alcohol, after which the resulting mixture is poured, with stirring, into 65 parts of an 80% (by volume) methanol-water solution. The precipitated polymer is filtered off, washed with 80% methanol, redissolved in benezene, and then reprecipitated with 80% methanol until any unreacted benzoyl peroxide is removed. The polymer purification is carried out in a nitrogen atmosphere to prevent undesirable side reactions induced by oxygen from the air.

Five grams of the purified allyl methacrylate polymer prepared as described above is dissolved in 95 grams of benzene. A sheet of highly polished polymethyl methacrylate, ⅛" thick, is thereafter immersed in the solution and then dried in air. The sheet is enclosed in aluminum foil and thereafter irradiated with 2 mev. electrons to a total radiation dosage of 5 mrad. The resulting sheet has a transparent polymer coating grafted on its surface and this coating exhibits improved scratch resistance over an unmodified control.

The scratch resistance is tested by dragging a weighted scribe over the surface and comparing the weights required to scratch the coated slab and the control.

Example XXXII

Polypropylene with a melt index of zero (ASTM D1238–57T) and a crystallinity of about 65% as measured by infrared absorption is molded at 200° C. and 8000 lbs./in.$^2$ pressure between polytetrafluoroethylene sheets to yield a transparent, flexible film 5 mils thick.

A portion of this film weighing 0.2099 g. is placed in a glass container of 160 ml. capacity and the container is evacuated by pumping at 0.2 mm. pressure for 4 hours.

Acrylonitrile monomer vapor is then admitted to bring the pressure in the container to 88 mm. The container is sealed, cooled at −80° C. and irradiated with 2 mev. electrons for 3 passes as described above, for a total dosage of 6 mrad. While maintained at −80° C., the container is connected to a source of acrylonitrile vapor and let stand for 18 hours. The film of polypropylene with grafted acrylonitrile is removed from the container, rinsed in acetone and dried. The weight is 0.2974 g., an increase of 42%.

The improved ultraviolet light durability of the grafted film is shown by comparing it with a sample of the untreated polypropylene film starting material and a sample of the same polypropylene film which had been irradiated with 2 mev. electrons in air for a dosage of 3 mrad. The three films are exposed to ultraviolet light in a Fade-O-Meter for 40 hours and then portions of each film are examined for tensile strength as follows:

| | Tensile strength (lb./in.$^2$) |
|---|---|
| Polyproylene film with grafted acrylonitrile | 1330. |
| | 1550. |
| Polypropylene film starting material | 960. |
| | 880. |
| Polypropylene film irradiated in air | (Too brittle to test). |

The process of this invention is often advantageously carried out by irradiating at elevated temperatures. This is particularly effective when non-polymerizable modifiers are to be grafted to addition polymer substrates. These advantages are illustrated by the following example.

Example XXXIII

In the test shown in Table 9 below, films of the indicated polymers are coated with solutions of selected $C^{14}$-tagged reactants having an activity of 0.1 millicurie per gram. After evaporation of the solvent, the coated films are placed in an aluminum box with a top window of polyethylene terephthalate film 0.00025 inch thick. An atmosphere of flowing nitrogen is maintained in the box during irradiation. Each film is exposed to a dose of 500 watt-sec./cm.$^2$ of 2 mev. electrons (40 mrad). Temperatures are controlled as shown, by means of cooling baths or external heating; the irradiation dose rate is also controlled to maintain the temperature within the specified range. After irradiation, the samples are extracted in a Soxhlet extractor with the indicated solvent, until retained activity is constant, as indicated by an end-window Geiger counter (Tracerlab Superscaler).

The retained activity value shown in Table 9 (in units of counts/min./2.5 cm.$^2$) represents the difference between the total count above background of the treated sample and the count of a control treated identically, except for omission of the irradiation step.

perature of at least 100° C. and frequently preferably higher, moderately improved grafting efficiency may also be obtained either by preheating the coated substrate at 100–160° C. prior to irradiation or by similarly heating the coated substrate immediately after irradiation.

Example XXXIV

It is often desirable to treat addition polymer substrates with water prior to or during grafting; this seems to have an accelerating effect on irradiation-grafting reactions. The water may be used as an aqueous solution of the modifying agent in which the substrate is soaked or it may be applied after the substrate has been coated with modifier. This latter process is illustrated by the following example.

A film of polyethylene is wet with a 1.2% ethanol solution of glycerol-1-$C^{14}$ (activity of 0.1 millicurie per gram). The ethanol is allowed to evaporate, and the film is then wet with water and irradiated at 50° C. in an atmosphere of moist nitrogen. Two mev. electrons are used, with a total dose of 40 mrad. The irradiated film is then extracted with water until the bound activity, determined by a Geiger counter, remains constant. The activity is 46 to 56 counts/min./2.5 cm.$^2$ above background.

When the test is repeated, the only difference being that the film is not pretreated with water prior to irradiation, a product is obtained which, after washing, retains an activity of only 18 counts/min./2.5 cm.$^2$ above background.

When stearic acid-2-$C^{14}$ is used as a modifying agent grafted to polyethylene film, the amount grafted following a water pretreatment is double that obtained in the absence of water.

Example XXXV

A film of polyethylene is soaked in a 25% aqueous solution of acrylic acid. The film, still wet with the solution, is wrapped in aluminum foil and irradiated at 50° C. with 2 mev. electrons to a total dose of 40 mrad. The irradiated film is then extracted with hot running water to constant weight; it shows a weight gain of 20%.

In contrast, similar irradiation of a similarly treated polyethylene sample in which the film is air-dried prior to irradiation produces a film which, after similar extraction, exhibits a weight gain of 16%.

Example XXXVI

A swatch of polyacrylonitrile fabric is soaked for 1 hour at 95° C. in a solution of dicyclopentenyl alcohol, followed by irradiation at the soaking temperature using 2 mev. electrons and a dose of 12 mrad. The fabric is laundered five times and is then tested for wickability. A drop of water placed upon the fabric disappears in 69 seconds, whereas a drop of water placed on a similarly treated, non-irradiated control, disappears in 205 seconds.

TABLE 9

| Sample | Polymer substrate | Coating material | Extractant | Retained activity after irradiation at— | | | | |
|---|---|---|---|---|---|---|---|---|
| | | | | 0° C. | 37–56° C. | 60–100° C. | 100–121° C. | 150–170° C. |
| 33A | Polyacrylonitrile | Palmitic acid-1-$C^{14}$ | Ether | | 2 | | 15 | 15 |
| 33B | Polytetrafluoroethylene | do | do | 4 | | 9 | 42 | 54 |
| 33C | do | Glycerol-1-$C^{14}$ | Water | | | 3 | 26 | 11 |
| 33D | Polyvinyl alcohol | do | do | | | 0 | 9 | 41 |
| 33E | do | Palmitic acid-1-$C^{14}$ | Ether | | | 0 | 225 | 1,800 |

These data illustrate the substantial increase in the amount of grafting of the test coating when the temperature of irradiation is above about 100° C., and preferably between 100 and 160° C. This effect is obviously most useful on polymer substrates having a crystalline melting point above 160° C. While optimum grafting efficiency is obtained by carrying out the irradiation step at a tem- Improved efficiency in the practice of the process of this invention is often obtained when the polymer substrate contains a plasticizer. This improvement is illustrated by the following example.

Example XXXVII

A 2 mil film of polyvinyl chloride plasticized with didimension as in an ordinary staple fiber. These distinct strands are termed herein as "fibrils" and, of course, differ from the staple fibers in an ordinary staple yarn in that the ends of a "fibril" are normally integral with the ends of other fibrils in a plexifilament so that the whole plexifilament is unitary with the fibrils combining and separating at random longitudinal and cross-sectional intervals. The term "fibrous" is also used in the sense that a sponge or a paper is fibrous and thus includes the partitioning structures in plexifilaments which are perforated with tunnels or which contain numerous closed cavities throughout. The fibrous character of all plexifilaments is readily apparent from the fact that all are much more resistant to tearing or breaking transversely than to splitting lengthwise, showing that in both fibrillous plexifilaments (those containing substantially all fibrils and few, if any, tunnels or cavities) and in foamy or spongy plexifilaments containing a multitude of tunnels, cavities or both and substantially no fibrils, the polymeric material is distinctly fibrous in structure and the fibers in plexifilaments are oriented longitudinally. Further evidence lies in the observation that fibrils in plexifilaments are also longitudinally oriented as are elongated tunnels and/or elongated cavities when present.

In general, tunnel and cavity walls and fibrils throughout a plexifilament have a thickness of less than about 2 microns and preferably less than 1 micron.

In view of the foregoing description, it is apparent that these flash-spun filaments have a much higher surface-to-volume ratio than conventional round or crenulated filaments, when internal cavities are considered. Thus, addition polymer substrates in this physical form are highly desirable as substrates for radiation-grafting processes, since a smaller radiation dose (under constant treating conditions) is required to graft a given weight of modifier to these flash-spun filaments than conventional filaments of the same denier. Conversely, of course, the same dose provides a greater weight gain.

Modification of these flash-spun fibers is shown in the following examples.

*Example XLII*

Thirteen parts of linear polyethylene of 0.5 melt index and 87 parts of methylene chloride are charged to an autoclave, and are heated for 4 hours at 190–195° C. with stirring. The autogenous pressure is about 500 p.s.i. Following the heating-dissolving step, a gate valve at the bottom of the autoclave is opened and the solution is flash-extruded through an extrusion orifice which is 86 mils in diameter and 86 mils long. The flash-extruded product is a plexifilament structure characterized by a plurality of fibrils which unite and separate at random longitudinal and cross-sectional intervals throughout the strand to provide a three-dimensional unitary network or web in which all elements are all integral with each other. Thus, it resembles very closely a staple fiber yarn without loose ends.

A portion of the as-spun yarn is drawn threefold while traversing a bath of ethylene glycol heated to 130–133° C. Fabrics are woven from the undrawn yarn, which has a denier of 700 to 1100, and from the drawn yarn, which has a denier of 200 to 300.

Portions of these fabrics are treated as indicated in Table 10, by soaking in acrylic acid solution for a period of 2 hours at room temperature; the fabrics, still wet with the treating solution, are irradiated to a dose of 2 mrad, using 2 mev. electrons as described hereinabove. After irradiation, the fabrics are scoured two times in methanol on a steam bath, followed by rinsing in hot distilled water at 70° C., followed in turn by treatment for 40 minutes in a 2% sodium carbonate solution at 70°. The sodium carbonate treatment forms a sodium salt of the grafted acrylic acid. Excess sodium carbonate is removed by rinsing in hot water at 70° C. A weight gain for each sample is also indicated in Table 10.

TABLE 10

| Sample | Yarn | Treating solution | Weight gain, percent |
|---|---|---|---|
| 42A | Undrawn | 20% acrylic acid in heptane | 24.5 |
| 42B | Drawn | do | 17.2 |
| 42 | do | 30% acrylic acid in heptane | 32.8 |
| 42C | Undrawn | 20% acrylic acid in water, 0.1% sodium salt of lauryl alcohol sulfate. | 5.6 |

Fabric tests upon sample 42C show that it is highly resistant to hole melting. For example, a lighted cigarette cannot be pushed through the fabric, and the fabric is still pliable after cooling. The sodium acrylate-grafted fiber does not break when held directly over a lighted cigarette under considerable tension whereas an unmodified yarn breaks immediately under the same conditions. In addition, the modified fabric has increased dyeability, improved hand, and better dry and wet crease recovery.

*Example XLIII*

A second batch of yarn is prepared as in Example XLII, starting with a 13% solution of linear polyethylene of melt index 0.5, as before. When the polymer is dissolved, the autoclave pressure is increased to 650 p.s.i., using nitrogen from a pressure cylinder. The yarn is flash-extruded as before, except that, prior to extrusion, the solution is filtered through a series of stainless steel screens. The fiber has a tenacity of about 1.3 gpd.

About 20 grams of the undrawn fiber prepared as described above is placed in a 1 gallon polyethylene bag containing 400 ml. of an 8% solution of acrylic acid in heptane. The fiber is soaked for 2 hours at room temperature, and then the bag containing the solution and fiber is irradiated in two passes (once from each side) to a total dose of 2 mrad.

The irradiated fiber is washed in cold methanol, then in hot methanol, followed by rinsing in distilled water at 70° C. The grafted fiber is then heated for 40 minutes in 5% aqueous sodium carbonate at 70° C., followed by two rinses in hot distilled water to remove excess sodium carbonate. The fiber is then dried, and the weight gain, due to grafted sodium acrylate, is found to be 58.5%.

The grafted fiber, coded 43A, is cut into pieces approximately ¼" long and is then stirred into sufficient distilled water to form a 1% suspension. The fiber disperses readily without beating. An equivalent weight of kraft cellulose paper pulp is added, and is dispersed in the water. The dispersion is then diluted to make a suspension containing a ¼% total fiber, and paper is formed by depositing the fibers on a 100 mesh screen to make a hand sheet. The sheet is removed from the screen, and is dried at 110° C., allowing shrinkage to take place. The sample is then calendered in a press at 150° C. and 60 p.s.i. for 1 minute. This treatment causes fusion of the polyethylene filaments.

Following the above procedure, a sheet of 100% kraft pulp, 43B, is prepared as a control. The samples are then tested, with the results shown in Table 11.

TABLE 11

| Sample | 43A | 43B |
|---|---|---|
| Composition, parts: | | |
|   Polyethylene fiber | 50 | 0 |
|   Kraft pulp | 50 | 100 |
| Tensile strength [a] (lbs./in./oz./yd.²) | 13.3 | 12.8 |
| Frag energy,[b] kg.m | 0.360 | 0.085 |
| Water vapor permeability,[c] gm./m.²/24 hr | 5.0 | 890 |
| Abrasion resistance, cycles [d] | 120,000 | 590 |
| M.I.T. fold endurance, cycles [e] | 421,000 | 1,600 |

[a] Tensile strength measured using an Instron Tensile Tester.
[b] Determined on the Frag Tester, sold by the Testing Machine Co., New York, N.Y.
[c] Permeability measured using Thwing Vapometer cup.
[d] Taber abrasion test.
[e] TAPPI Standards T-423-M-50.

butyl sebacate (100 parts polyvinyl chloride, 60 parts of the sebacate plasticizer) is wet with a 1.2% solution of glycerol-1-$C^{14}$ in ethanol (0.1 millicurie/gram), allowed to dry in air for 1 hour, and is then blanketed with nitrogen and irradiated with 2 mev. electrons at 40° C. to a total dose of 40 mrad. Non-grafted glycerol is removed by extracting the irradiated film with running water until the radioactivity, as measured by an end-window Geiger counter, remains constant. The retained activity is then 38 counts/min./2.5 cm.$^2$ above background. On the basis of a separate calibration by combustion analysis, this level of activity is equivalent to about $10^{-6}$ gram of bound glycerol per cm.$^2$.

Similar treatments of a film of polyvinyl chloride/di-2-ethylhexylphthalate (100/60) gives an ultimate retained activity of 47 counts/min./2.5 cm.$^2$ above background.

In contrast, similar treatment of a film of unplasticized polyvinyl chloride gives an ultimate retained activity of less than 5 counts/min./2.5 cm.$^2$ above background.

*Example XXXVIII*

A 0.003" film of a copolymer of tetrafluoroethylene containing about 16% by weight of hexafluoropropylene, prepared according to the process of U.S. Patent 2,549,935, is wet with glycidyl methacrylate and wrapped in 0.001" aluminum foil. The foil is rolled into smooth contact with the coated film, to assure uniform spreading of the glycidyl methacrylate. The assembly is then irradiated with 2 mev. electrons to a dosage of 5 mrads, heated one hour at 100° C., the foil removed, and the copolymer film is then extracted to constant weight with acetone at room temperature. A weight gain of 2.7% is obtained. This is equivalent to about 2 g./sq. meter. The treated film exhibits excellent adhesion to a polymeric epoxide adhesive. The adhesive bond survives forces sufficient to tear the film (2000 g./in. of seal). Using this adhesive, the treated film is adhered to itself, to glass, and to metals. The treated film is also adherent to cyanoacrylate adhesive, and it exhibits improved ink receptivity.

Similar treatment of films of polyethylene and of polyvinylfluoride likewise yields products of excellent adhesion to epoxide resins.

*Example XXXIX*

A 0.002" film of polyethylene is immersed in monomeric acrylonitrile, irradiated with 2 mev. electrons to a dosage of 5 mrad and extracted to constant weight with dimethylformamide. A weight gain of 101% is obtained. The product is stiffer and tougher than unmodified polyethylene. It has a tensile strength of 3123 lbs./sq. in., and elongation of 152% and a modulus in tension of 38,226 lbs./sq. in., as compared with values of 2826 lbs./sq. in., 199% and 9,932 lbs./sq. in., respectively for unmodified polyethylene. The product exhibits better durability in an accelerated weatherability test than unmodified polyethylene. After drawing to about five times its initial length at 200° C., the product has a tensile strength of 27,130 lbs./sq. in., an elongation of 12%, and a modulus of 409,000 lbs./sq. in.

*Example XL*

A 0.002" film of polyethylene is immersed in monomeric vinyl acetate, irradiated with 2 mev. electrons to a dosage of 5 mrad and extracted to constant weight with ethanol. A weight gain of 58% is obtained. The product is stiffer and tougher than unmodified polyethylene and it is highly permeable to water vapor. It has a permeability value of 822 g./100 m.$^2$/hr./mil, as compared with a value of about 30 for unmodified polyethylene.

*Example XLI*

A 2 mil film of polyethylene is immersed in a 10% aqueous solution of polyacrylic acid containing 0.1% of the dioctyl ester of sodium sulfosuccinate ("Aerosol OT"), wrapped while still wet in 0.7 mil aluminum foil and irradiated with 2 mev. electrons to a dose fo 40 mrad. Prior to the irradiation treatment, a 0.16 cm. thick aluminum shield, electrically grounded, is placed upon the sample package. After extracting the sample with water in a Soxhlet extractor, and drying to constant weight, the film exhibits a weight gain of 19.7% and a log R of 12.7. When the test is repeated, replacing the polyacrylic acid solution with a 10% aqueous polymethacrylic acid solution, a weight gain of 2.2% is observed.

An important embodiment of the present invention, as previously mentioned, is obtained by permitting the modifier, e.g., a vinyl monomer, to penetrate the polymer substrate prior to irradiation grafting. The product obtained thereby is thus modified throughout all or at least a substantial portion of its bulk, although the modifier was merely applied to the surface of the solid polymer. Preferred substrates are those which have at least one relatively small dimension, such as films and fibers, as described hereinabove. Especially preferred substrates are those prepared by the flash-spinning process described and claimed in U.S. application Ser. No. 736,337 by H. Blades and J. R. White. The process of the Blades and White invention provides a yarn-like strand having the beneficial properties of both staple fiber yarns and continuous filament yarns. These strands, hereinafter referred to as "plexifilaments," have the bulk of staple fiber yarns but are substantially entirely without loose ends, and like continuous filament yarns have high strength even at zero twist. Plexifilaments are unlike both staple and continuous yarns in being unitary and no twist is necessary to hold a plexifilament together.

The novel characteristics of a plexifilament are directly related to its physical structure which may be characterized as a three-dimensional fibrous integral plexus of a synthetic organic fiber-forming polymeric material. Within the framework of this structure, plexifilaments may have properties varying over a wide spectrum; but, in general, a plexifilament comprises a multitude of fibrillous strands or sections which intermittently unite and separate at random intervals both longitudinally and transversely to form a continuous three-dimensional integral fibrillous plexus ranging in appearance from that of an elongated matted cobweb to that of a slick continuous filament yarn and which in some instances has the exterior of a monofilament yarn even though the interior is always a three-dimensional integral fibrous plexus as described above.

In one embodiment, the plexifilament contains a labyrinth of innumerable fine (small in cross section) longitudinal tunnels which may interconnect at random intervals, and in another but closely related embodiment the plexifilament contains, not tunnels, but is honey-combed with a multitude of longitudinally elongated closed cavities, or the plexifilament may contain both tunnels and cavities. In all cases, these tunnels or cavities or both are distributed throughout the strand both longitudinally and transversely to provide the unitary fibrous plexus which is one of the distinguishing characteristics of a plexifilament. By working such a plexifilament, hereinafter referred to as a "foamy" plexifilament, as by drawing, twisting, pressing, cavities present may collapse with considerable popping noise.

In another embodiment, the plexifilament is substantially free of tunnels and/or cavities and is characterized by a plurality of fibrils which unite and separate at random longitudinal and cross-sectional intervals throughout the strand to provide a three-dimensional unitary network or web in which all elements are integral with each other, thus resembling a staple fiber yarn without loose ends.

The term "fibrous," as used herein, is intended to include individual and distinct strands characterized by a length many times greater than the greatest transverse These results show that the grafted polyethylene filaments, when added to kraft pulp, yield a paper which is stronger than 100% kraft, has greatly improved energy absorption (Frag energy), which is a measure of a resistance to bursting when a bag containing heavy articles is dropped, and in addition is highly resistant to permeability by water vapor, resistant to abrasion and to repeated folding.

Although this example employed a 60% graft of sodium acrylate to the polyethylene fiber, other amounts are also suitable. For example, from 10 to 120% or more produces desirable modification. Other ions may also be used to form the salt of the acrylic acid graft, although sodium ion is preferred.

Many other unsaturated organic acids are useful in modifying addition polymer filaments to improve their utility, for example, for making paper. Thus, the unsaturated monocarboxylic acids such as acrylic acid and methacrylic acid are suitable; for some purposes, difunctional acids such as maleic, fumaric, and the like may be employed, although acids which are not homopolymerizable may require an excessive radiation dose. In addition, styrene sulfonic acid, ethylene sulfonic acid and the like are suitable for special purposes. It may sometimes be desirable to graft the acid as the preformed salt, e.g., as sodium acrylate, sodium styrene sulfonate, etc.

The flash-extruded yarn is the preferred substrate to which the organic acid is grafted. The grafting step may be carried out with either drawn or undrawn yarn, with the fiber slurry, or even (less desirable) in paper form. In some cases, the acid may also be grafted to the flake prior to dissolving it in the autoclave. In preparing grafted flake to be used for flash spinning, it is necessary to avoid modification which renders the substrate insoluble in the preferred flash spinning solvent.

Also, highly ionic forms such as the salts of strong organic acids graft more readily to the flash-spun fibrous product than to hydrophobic polymer flake; hence grafting to the yarn is preferred.

Although the grafting reaction has been described as a batch operation, it may also be carried out continuously either supplementary to or, preferably, as a separate operation from flash-spinning.

The grafted product of the above example may be used in a wide range of compositions with kraft or other pulps to make useful paper products. In addition, the grafted products are suitable for making 100% synthetic fiber paper. Especially useful compositions are obtained by blending acid-grafted and unmodified flash-spun fiber. It has been observed that it is important to permit shrinkage during the drying step. Calendering is usually desirable and better results are usually obtained if the temperature is high enough to permit some fusing of the synthetic fiber filaments, thus promoting bonding and increased strength and vapor resistance.

The paper-making process may, of course, be carried out continuously on conventional paper machinery. Although dispersing agents are usually unnecessary in the acid-grafted polymer slurry, such may be included, without harmful effect. Other conventional additives may also be employed, such as sizes, fillers, and the like.

The filamentary structures described above are produced by "flash spinning" a homogeneous solution comprising a synthetic fiber-forming addition polymer in an organic liquid which is a solvent for the polymer at the elevated temperature employed; typical conditions are shown in Examples XLII and XLIII. The solution is extruded from a vessel, maintained at a temperature above the normal boiling point of the organic liquid and at superatmospheric pressure, through a spinneret containing one or more holes into a medium at a lower pressure, preferably air at normal atmospheric pressure. Temperature and pressure conditions in the extrusion vessel should be sufficiently high so that most of the solvent is flashed off immediately upon opening of the valve, i.e., immediately upon relief of pressure on the confined solution. This valve is a part of the spinneret assembly and may be located ahead or behind the orifice. The process of the present invention, in contrast to known solution spinning processes, operates at an extrusion temperature (temperature of the solution immediately prior to extrusion) substantially above the boiling point of the spinning solvent utilized, and preferably at least 40° C. above the boiling point of the solvent so that most of the solvent is flashed-off upon extrusion. Extremely high spinning speeds are attained normally being in excess of about 5000 y.p.m. per orifice. Productivity of about 13,000–15,000 yards of filamentary material per minute per hole are obtainable.

Flashing-off of solvent during the spinning process of this invention is much like the flash evaporation of solvent in well-known flash distillation procedures. The rapid and substantial reduction in pressure upon the confined polymer solution when the extrusion orifice is opened results in an almost violent escape of solvent, causing multitudinous longitudinal ruptures of extruded polymer and resultant production of the integral fibrous plexus, ranging from a completely fibrillous plexus at one extreme to a porous, longitudinally extended tunnel-containing yarn-like bulky foamy strand at the other. It is surprising that, despite the violent nature of the process, indefinitely continuous strands are obtained.

As mentioned above, the extrusion vessel is kept at a temperature above the boiling point of the liquid used and at superatmospheric pressure. Autogenous or higher pressures may be employed.

It is important that the polymer solution to be extruded contain at least 5% polymer by weight and that temperature and pressure within the extrusion vessel be controlled as explained above. If the concentration of polymer solution is too low for the particular spinneret assembly used, the polymer extruded is blown apart and the continuous product is not obtained. If in the same assembly the solution temperature is too high, the extruded polymer may be fused or blown apart depending on the thermal properties of the solvent. Conversely, if polymer solution concentration is too high or the temperature of the solution in the extrusion vessel is too low for the particular spinneret assembly used, a foamy, non-fibrillous product is obtained. It is also important that the polymer solvent utilized have a boiling point substantially lower than the melting point of the polymer and possess a substantial vapor pressure at the extrusion temperature if the structure of the instant invention is to be produced.

While the plexifilaments irradiation-grafted by the process of this invention have been illustrated in Examples XLII and XLIII by use of hydrocarbon polymers, such as polyethylene, it will be readily appreciated that similar structures may be prepared from other hydrocarbon polymers, such as polypropylenes, poyl-(isobutyl ethylene), ethylene copolymers with alkenes, vinyl acetate, etc.; vinyl polymers such as polyvinyl chloride, polyvinyl fluoride, polyacrylonitrile, copolymers of acrylonitrile (preferably those prepared from monomers containing more than about 85% acrylonitrile), and the like; poly(tetramethyl butadiene), etc.

POLYMER SUBSTRATE

The synthetic organic addition polymers used in the process of this invention are those which are primarily carbonaceous in character, i.e., have polymer chains which consist primarily of carbon-carbon bonds. The preferred polymers are those which have a linear structure. Such polymers are eminently suited to the production of fibers and films, to which the process of this invention is most advantageously applied. Since the preferred polymers are those which are fiber- or film-forming, they are characterized by having a high molecular weight.

As previously mentioned, these substrates include those polymers formed by vinyl polymerization from monomers such as styrene, substituted styrene, the acrylic acid esters, vinyl halide, vinylidene halide, the vinyl esters, ketones and ethers, the halogen, sulfur, nitrogen and phosphorous containing vinyls, the vinyl silanes, ethylene, propylene, the allyl esters, acrylonitrile, methacrylonitrile, 1,3-butadiene, isoprene, chloroprene, 2,3-dimethyl-1,3-butadiene and the like. The addition polymer substrates may be homopolymers or copolymers, as desired.

A preferred polymer subgenus for the practice of this invention includes those addition polymers which are useful in preparing flash-spun yarn, as described hereinabove. These polymers are those which form homogeneous solutions at autogenous or higher pressures in a solvent or solvent mixture boiling at least 25° C. below the softening point of the polymer. Such solutions do not have to be homogeneous at room temperature; it is usually required that a homogeneous solution of the polymer in the appropriate solvent exists at a temperature at least as high as the boiling point of said solvent or solvent mixture under autogenous or higher pressures. Typical polymers have been mentioned previously.

SUBSTRATE SHAPE

Shaped articles may be made by extrusion, molding, casting and the like. The shape of the article to which the organic compound is adhered is not critical; it is sufficient that it be a solid so that the location of the modifier may be readily controlled. Thus the process of the present invention may be applied to a solid substrate in any form such as a fiber, film, sponge, or pellicle. It may be in the form of a woven, knitted, or felted fabric, a paper, a bristle, a fibrid, or artifical straw. Alternatively, the structure may be a flake, powder, or comminuted particle, which may be reshaped after grafting to form an article of specific end use. The shape is not a critical element in the treatment, except that shapes of increased thickness require a proportionately greater soaking time or high temperature or pressure when complete diffusion of the organic modifier is desired. If limited penetration is desired, thickness of the shaped structure is not of importance in determining process details. It is merely sufficient that the irradiation employed have enough penetration to activate the substrate at least to the maximum depth required to effect the desired grafting to the shaped polymer.

By way of explanation, the "fibrid" substrate referred to hereinabove is the synthetic polymer analogue of beaten cellulose, described by Morgan in U.S. application Ser. No. 635,876 (filed Jan. 23, 1957). By the process of this invention, organic modifiers may be grafted to addition polymer fibrids as a slurry, or as a paper-like material, to improve wickability, printability, water repellence, tear strength, adhesion and the like.

OPERABLE MODIFIERS

Any organic compound may be employed as the modifying material which may be grafted to the shaped article. By an "organic compound" is meant a material having the formula $CX_4$ where X is a member of the group consisting of hydrogen, halogen, nitrogen, nitrogen radical, oxygen, oxygen radical, sulfur, sulfur radical or organic radical linked to the CX residue by a carbon-to-carbon bond. Furthermore, the C may be doubly bonded to no more than one $S=$ or $O=$ atom; i.e., only one pair of X's may be replaced by a divalent oxygen or sulfur atom. Compounds with aliphatic unsaturation are especially preferred, since a minimum radiation dose is required to graft a given weight of modifier.

UNSATURATED MODIFIERS

Among suitable materials are hydrocarbons such as ethylene, propylene, styrene, α-methyl styrene, divinyl benzene, 1,3-butadiene, 2,3-dimethyl-1,3-butadiene, 2-chloro-2,3-butadiene, isoprene, cyclopentadiene, chloroprene; acids such as maleic acid, crotonic acid, dichloromaleic acid, furoic acid, acrylic acid, methacrylic acid, undecylenic acid, cinnamic acid; amides such as acrylamide, methacrylamide, N-methylolacrylamide, N-methyl, N-vinyl formamide, N-vinyl pyrrolidone, methyl substituted N-vinyl pyrrolidone, vinyl oxyethyl formamide, methylene-bis-acrylamide, N-allylcaprolactam; acrylate esters such as methyl acrylate, ethyl acrylate, benzyl acrylate, octyl acrylate, methyl methacrylate, butyl methacrylate, vinyl acrylate, allyl acrylate, ethylene di-acrylate, diallyl itaconate, diethyl maleate, N,N-diethylaminoethyl methacrylate, dihydroxy dipyrone; nitriles such as acrylonitrile, methacrylonitrile; acrylyl halides such as acrylyl chloride; vinylic alcohols such as allyl alcohol, furfuryl alcohol, 3-hydroxycyclopentene, dicyclopentenyl alcohol, tropolone; aldehydic compounds such as acrolein, methacrolein, crotonaldehyde, furfural, acrolein diethyl acetal; vinyl amines such as vinyl pyridine, allyl amine, diallyl amine, vinyloxyethylamine, 3,3-dimethyl-4-dimethlyamino-1-butene, N,N-diacryltetramethylene diamine, N,N-diallyl melamine, diamino octadiene; quaternized amines such as tetraallyl ammonium bromide, vinyl trimethyl ammonium iodide, the quaternary methiodide of methylene-3-aminomethylcyclobutane; vinyl esters such as vinyl acetate, vinyl salicylate, vinyl stearate, allyl formate, allyl acetate, diallyl adipate, diallyl isophthalate; vinyl ethers such as allyl glycidyl ether, vinyl 2-chloroethyl ether, dihydropyrane, methoxy polyethyleneoxymethacrylate; vinyl halides such as vinyl chloride, vinyl fluoride, tetrachloroethylene, tetrafluoroethylene, 1,1-dichloro-2,2-difluoroethylene, vinylidene chloride, hexachloropropene, hexachlorocyclopentadiene, p-chlorostyrene, 2,5-dichlorostyrene, allyl bromide, 2-bromoethyl acrylate, vinyl tetrafluoropropionate, 1,1,7-trihydroperfluoroheptyl acrylate; isocyanate type compounds such as vinyl isocyanate, acrylyl isocyanate, allyl isothiocyanate; vinyl ketones such as methyl vinyl ketone, ethyl vinyl ketone; cyanides such as methacrylyl cyanide, allyl isocyanide; nitro compounds such as 2-nitropropene, 2-nitro-1-butene; phosphorous containing vinyls such as diethyl vinyl phosphate, diphenyl vinyl phosphine oxide, 1-phenyl-3 phosphacyclopentene-1-oxide, diallyl benzene phosphonate, potassium vinyl phosphonate, bis-chloroethyl vinyl phosphonate; also included are alkyl, aryl, aralkyl phosphonates, phosphites and phosphonates; sulfur containing vinyls including sulfonates, sulfonamides, sulfones, sulfonyl halides; thiocarboxylates, such as diallyl sulfiide, ethylene sulfonic acid, allyl sulfonic acid, methallyl sulfonic acid, styrene sulfonic acid, 2-methylpropene-1,3-disulfonic acid, also including salts and esters of the sulfonic acids; epoxy vinyls, such as butadiene oxide, 1,2-diisobutylene oxide, glycidyl methacrylate.

Acetylenes such as phenylacetylene, acetylene dicarboxylic acid, propiolic acid, propargylsuccinic acid, propargyl alcohol, 2-methyl-3-butyn-2-ol, 2,2,3,3-tetrafluorocyclobutylvinylethylene and the like may be used successfully.

NON-POLYMERIZABLE MODIFIERS

In addition to compounds containing ethylenic unsaturation, it has been found that compounds can be grafted, according to the process of this invention, which are ordinarily regarded as non-polymerizable. By non-polymerizable is meant those compounds, free from aliphatic unsaturation, which do not polymerize by free radical initiation. Due to the efficiency of the high-energy radiation in producing free radicals, it is theorized that free radicals are produced simultaneously on the polymer substrates and on the saturated non-polymerizable compounds, whereupon grafting ensues. The preferred non-polymerizable compounds are those which have functional groups which are useful in modifying polymer properties. Thus, such compounds are included as hydrocarbons, alcohols, acids, ethers, ketones, esters, aldehydes, isocyanates, sulfonates, mercaptans, thioethers, disulfides, nitriles, nitro compounds, amines, amides and halides. Typical of suitable alcohols are the alkanols such as methanol, ethanol, laurol, the polyols, such as glycerine, pentaerythritol, sorbitol, mannitol, their partial esters and the like. Dialkyl ethers such as dimethyl, diethyl, ethylmethyl and the glycol ethers as well as the oxyalkylated ethers of partial esters of the polyols, such as the polyoxyethylene derivative of a fatty acid partial ester of sorbitol are suitable. Mercaptans and thioethers analogous to the above may be used as may also disulfides of a similar nature. As amines may be mentioned the alkyl amines such as methyl amine, ethyl amine, hexamethylene diamine and dodecylamine. The amides of these amines formed with acids such as formic acid, adipic acid, suberic acid, stearic acid and the like are useful; alternatively, the acids alone are often desirable modifiers. Halides within the preferred class, include the alkyl halides such as chloromethane, chloroform, carbon tetrachloride, chloroethane, chloroethylene, dichlorodifluoromethane, dodecafluoroheptyl alcohol and similar materials.

Of the non-polymerizable compounds, those organic compounds, the bonds of which are easily broken, as, for instance, chain transfer agents, are particularly preferred, since larger amounts of modifier are grafted with a given irradiation dose.

It is, of course, obvious that low molecular weight non-polymerizable modifiers are preferred, when it is desirable to have the modifier penetrate into the polymer substrate, to make a bulk modification. It has been observed that modifiers with functional groups which have a swelling effect upon the polymer substrate are usually especially effective in penetrating the substrate.

POLYMERIC MODIFIERS

Polymeric modifiers are a preferred class for grafting to polymeric substrates, especially those substrates which are in the form of fibers, filaments, fabrics, films or the like. These modifiers are especially suitable when a surface coating is desired, since it is obvious that their ability to penetrate will be limited. When irradiating these compositions, it is believed that the coating is grafted by chemical bonds to the fiber surface. Therefore, the process of this invention gives a much more durable coating than those obtainable by prior art processes which require polymerization initiators to cross-link the coating and depend on mere physical bonds to retain the coating upon the polymer substrate. The polymeric modifiers are especially adaptable to the process of this invention, since relatively few bonds are needed to graft each large macromolecule to the substrate surface.

The process of this invention is especially suitable for washfast modification of fibers and fabrics, as has been shown by the examples hereinabove. An important feature is that these advantages are obtained primarily because these polymeric modifiers are applied in a relatively fluid state, (e.g., from solutions) so that each filament in the fabric is individually coated, and large excesses of the modifier are avoided. Excess amounts of modifier result in a deleterious effect on fabric hand, and often render the fabric unfit for apparel use. The preferred polymeric modifiers are those which are soluble or dispersible in aqueous solutions, although other solvents may be used in some cases. However, water is the preferred solvent because of its cheapness, availability, and freedom from hazards. Thus, such polymers are preferred as the polyether glycols, polypropylene ethers, polymeric alcohols, polymeric acids, polymeric amines, polymeric amides and the like. These compounds are useful, for example, in increasing moisture regain, antistatic effect, and wickability of addition polymer substrates which otherwise are highly hydrophobic. Alternatively, water repellance can be improved by grafting hydrophobic polymeric materials, usually utilizing a solvent other than water. Examples of such hydrophobic polymers are polytetrafluoroethylene, polyvinyl chloride, polymeric esters and the like.

STRUCTURE OF GRAFT COPOLYMER PRODUCT

The process of this invention produces a polymeric structure which has been termed a graft copolymer, that is, a polymer in which a modifying agent (monomer, organic compound, or polymeric chain) is grafted by chemical bonds, usually as a side chain, to the parent polymeric substrate.

Conventional copolymers, consisting of monomer species A and B, have a random distribution along the backbone of the polymer molecule and may be represented schematically thus:

—AAABBABBBABAA—

The graft copolymer species with which one embodiment of this invention is concerned, consists of a main chain of polymer A and side chains of polymer B grafted thereto, represented below:

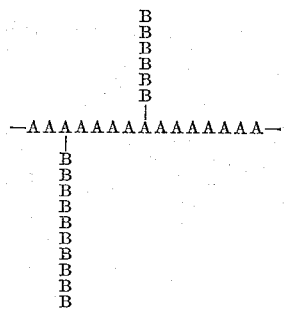

The characteristic of this copolymer type is that its gross properties remain predominantly those of the polymer (A) forming the molecular backbone. However, modifications can be produced via polymer (B) grafts, in most cases, without loss of the original desirable properties. As an example, conventional copolymers usually have a lower melting point than those of either component, while graft copolymers usually retain the high melting point of the pure backbone component. The structure and preparation of some examples of these copolymer types are discussed in a comprehensive review article by E. H. Immergut and H. Mark in Macromolekulare Chimie 18/19, 322–341 (1956).

It is obvious, of course, that when the modifier B is not homopolymerizable, single B units will be grafted to the polymer substrate A. Examples of such compounds are maleic acid, dodecafluoroheptyl alcohol, glycerol, palmitic acid and the like, illustrating another embodiment of the graft copolymer of the instant invention.

A third embodiment is that wherein the grafted modifier, B, is a preformed polymer (e.g., Carbowax, polyacrylic acid, polymethacrylic acid). In this case, it is unlikely that any substantial amount of polymer B is grafted to A by free radicals generated on the ends of the B chain, as suggested by the structural formula above; more typically, bonding will occur between polymer A and some intermediate atom in the polymer B modifier.

APPLICATION OF MODIFIER

The organic compound may be applied to its shaped substrate by immersion, padding, calendering, spraying, exposure to vapor condensation, or by other similar means. It is sometimes desirable to remove excess liquid by squeezing prior to exposure to irradiation. Alternatively, the organic compound may be deposited upon the shaped substrate by flashing-off the solvent in which it is dissolved prior to application.

As described previously, it is desirable that the modifier be applied to the substrate in a highly fluid condition; thus, application from solutions with a viscosity of the same order of magnitude as water are preferred. This permits completely coating each fiber of filamentary substrates.

It will be noted that the process of this invention is restricted to applying the modifier to the surface of the shaped addition polymer substrate, followed by irradiation to induce grafting. The process of the instant invention is directed to producing modifications throughout the bulk of the polymer substrate only when the modifier, applied to the surface, penetrates therethrough; for modifiers which do not penetrate, modification is restricted to the surface. Thus, when the polymer is penetrated with the modifier prior to initiating the graft polymerization, modification of the shaped structure extends at least through a substantial proportion of the body of the final product. Increased contact time and agitation are helpful in increasing penetration. It is sometimes beneficial to carry out the soaking for penetration at elevated temperatures, at superatmospheric pressure or in the presence of swelling agents, dye carriers, or the like. However, elevated temperatures are to be avoided when using modifiers, such as strong acids, which may degrade hydrolysis-susceptible polymers. Minor amounts of wetting agents, surface active compounds, and the like are useful for improving penetration efficiency.

When it is desirable to limit penetration of the polymerizable composition to a zone near the substrate surface, this may be accomplished by reduced contact time or temperature, or use of modifiers with greater chain length. Alternatively, the shaped substrate may be exposed to the modifier for the time required to effect the desired penetration, then penetration may be stopped by freezing, for example, with Dry Ice. The combination may then be irradiated while frozen, and grafting will occur when the combination is warmed.

Where the modifier is applied from a solution, water is usually the preferred solvent. Other liquids are suitable for this purpose, however, such as alcohol, benzene, toluene, glycol, high boiling ethers and the like; where high soaking or irradiation temperatures are used, a nonvolatile solvent is often advantageous.

RADIATION WHICH IS EFFECTIVE

The ionizing radiation useful in the process of this invention must have at least sufficient energy to non-selectively break chemical bonds. This radiation is to be distinguished from ultraviolet radiation, which is effective in activating or ionizing only specific chemical bonds; such bonds are responsive to ultraviolet radiation only of a given wave length or wave lengths. It is often necessary to use an ultraviolet photo-initiator in such reactions, so that light of available wave lengths will initiate the desired chemical reaction. In contrast, the ionizing radiation of this invention has sufficient energy so that it exceeds that which is required to break any chemical bond. Thus, this ionizing radiation serves to activate polymer substrates so that chemical reactions are initiated with any organic compound, or, alternatively, to activate non-polymerizable organic compounds so they react with the polymer substrate.

In general, ionizing radiation is preferred which has sufficient energy so that appreciable substrate thickness is penetrated, and, in addition, radiation absorption by the atmosphere is sufficiently low so that it is unnecessary to operate in a vacuum. Such radiation has energy of at least about 0.1 mev. Higher energies are even more effective; the only known upper limit is imposed by available equipment.

The ionizing radiation of the process of this invention is generally considered in two classes: Particle radiation, and electromagnetic radiation. Effects produced by these two types of radiation are similar, since in their interaction with matter, each generates secondary radiation of the other type. The important consideration is that the incident radiation exceed a minimum threshold energy. Details of the mechanism of the interaction of high energy electrons with organic matter, including polymers, are not completely known, but the initial reaction is considered to be the absorption of energy by the valence electrons of the irradiated molecules in or near the path of the high energy electrons. The absorbed energy may be so great that some valence electrons will be shot off fast enough to ionize still other molecules. Some of the displaced electrons fall back to form neutral molecules and give up their energy as electromagnetic radiation, which in turn can be absorbed by other molecules and thus raise them to an excited stage. Further redistribution of the energy in the molecules results primarily in C—C bonds splitting off H atoms or molecules, producing free radicals or unsaturation.

The similarity of effect between the two types of radiation is thought to be due to the fact that an electron is ejected when an atom absorbs a quantum of high energy X- or gamma-rays; the electron has sufficient energy so that it in turn ejects electrons from other atoms, corresponding in effect to irradiation with an electron beam. Thus, the initial effect of high energy irradiation is to produce high energy electrons, which within the irradiated substrate produce free radicals. Consequently, the effects produced by particle and electromagnetic irradiation of equivalent energy are very similar, and differ only in the rate at which the effect is produced, which is a function of dose rate. The dose rate is a function of the equipment available to produce it, rather than an inherent limitation of the type of irradiation. Thus, with present day equipment, higher dose rates are obtainable with electron irradiation than are obtainable with X-rays of equivalent energy.

Although the fundamental particles differ from one another in size and charge, their mechanism of energy loss is essentially the same. Thus, their effect on chemical reactions is also similar. Although the neutron is not a charged particle, it, however, produces protons and gamma-rays which lose energy in the normal ways and consequently is effective in the process of this invention.

The heavier charged particles, like the electrons, undergo inelastic collisions with the bound electrons of atoms which they eject to produce ions. Some of these ejected electrons may be sufficiently energetic to produce ionizations of their own. The energy of all these particles is used up in removing the bonded electron (i.e., in ionization) and in producing excited atoms until all the electrons have become of such low energies that they can no longer produce ionizations and are captured to form negative ions. Neutrons do not produce ionization directly, but knock out protons from the nucleus of the atoms they traverse. The chemical effects of fast neutrons are, therefore, almost wholly due to protons in exactly the same way as the effects of X-rays are produced by the ejected electrons. Unlike the other ionizing radiations, however, the number of ionizations produced by neutrons depends largely on the nature of the elementary composition of the material through which the neutrons pass. The reason for this is that the transfer of energy between neutrons and protons does not depend on the atomic number but on other factors, such as chemical composition of the absorbing material.

Therefore, the high energy particle radiation effective in the process of this invention is an emission of highly accelerated electrons or nuclear particles such as protons, neutrons, alpha particles, deuterons, beta particles, or the like, directed so that the said particle impinges upon the polymer bearing the organic compound. The charged particles may be accelerated to high speeds by means of a suitable voltage gradient, preferably at least 0.1 mev., using such devices as a resonant cavity accelerator, a Van de Graaff generator, a betatron, a synchrotron, cyclotron, or the like, as is well known to those skilled in the art. Neutron radiation may be produced by bombardment of selected light metal (e.g., beryllium) targets with high energy positive particles. In addition, particle radiation suitable for carrying out the process of the invention may be obtained from an atomic pile, or from radioactive isotopes or from other natural or artificial radioactive materials.

Similarly, ionizing electromagnetic radiation useful in the process of this invention is produced when a metal target (e.g., gold or tungsten) is bombarded by electrons possessing appropriate energy. Such energy is imparted to electrons by accelerating potentials in excess of 0.1 million electron volts (mev.). Such radiation, conventionally termed X-ray, will have a short wave length limit of about 0.01 Angstrom unit (in the case of 1 mev.) and a spectral distribution of energy at longer wave lengths determined by the target material and the applied voltage. X-rays of wave lengths longer than 1 or 2 Angstrom units are attenuated in air thereby placing a practical long wave length limit on the radiation. In addition to X-rays produced as indicated above, ionizing electromagnetic radiation suitable for carrying out the process of the invention may be obtained from a nuclear reactor ("pile") or from natural or artificial radioactive material, for example, cobalt 60. In all of these latter cases, the radiation is conventionally termed gamma-rays. While gamma radiation is distinguished from X-radiation only with reference to its origin, it may be noted that the spectral distribution of X-rays is different from that of gamma-rays, the latter frequently being essentially monochromatic, which is never the case with X-rays produced by electron bombardment of a target.

RADIATION ENERGY

To be efficient in the practice of the present invention, it is necessary that the high energy particles have sufficient velocities to permit penetration of several layers of material, when fabrics or films are being treated. Although an energy of about 50 mev. is enough to initiate the grafting reaction, energies of at least 0.1 mev. are preferred, for efficient penetration. The velocity required will depend on the nature of the particle and also on the nature of the substrate to a certain extent. Electrons accelerated by a potential of a million volts (mev.) will effectively penetrate a thickness of polyhexamethylene adipamide fabric of about 0.25 cm. A more universal measure of penetration for all substrates is in units of grams penetrated per square centimeter irradiated. Thus, 2 mev. electrons will effectively penetrate 0.7 gm./cm.$^2$ of any shaped article, while 1 mev. electrons are effective for 0.35 gm./cm.$^2$.

As stated previously, there is no known upper limit to the particle energy, except that imposed by present day equipment. Thus, energies equivalent to 24 mev. to 100 mev. may be used.

As a guide in using other charged particles which have been shown to be effective in grafting, Table 12 shows particle energies required to give penetration equivalent to 0.1 mev. electrons.

TABLE 12

| Particle: | Accelerating potential, mev. |
|---|---|
| Electron, e | 0.1 |
| Proton, H$^+$ | 3.0 |
| Deuteron, D$^+$ | 4.0 |
| Alpha, He$^{++}$ | 12.0 |

It should be recognized that the heavier charged particles are especially adapted to creating surface effects, due to their lower penetration at a given energy. In situations where surface effects are paramount, it is not necessary that the shaped article be completely penetrated by the high energy particle and lower accelerations may be employed. Under those conditions, if the surface effect is to be applied to both sides of the shaped article, it will obviously be necessary to expose each of the surfaces to the particle radiation. This is done by simultaneously bombarding both sides of the shaped article or alternatively by subjecting each side to the single source of irradiation during different runs.

High energy particle radiation has special utility for grafting modifiers to thin substrates, e.g., fabrics, filaments and films. The required irradiation doses with present day electron accelerators, such as exemplified herein, are attained rapidly in a matter of seconds, thus promoting a high rate of throughput.

In comparison, high energy electromagnetic radiation in short wave lengths is highly penetrating, and hence readily lends itself to treating massive substrates. When grafting to the preferred substrates of this invention, this type of radiation is especially useful for irradiating materials present in multiple layers. For example, rolls of film, bolts of fabric, yarn packages, bales of staple fiber, or the like, may be irradiated as a single unit.

As an illustration, X-rays generated by electrons of 2 mev. have adequate penetration for polymer samples of several inches in thickness. Lower energy (longer wave length) X-rays are, of course, less penetrating, so that it may be necessary to reduce the thickness of material to be treated simultaneously. In addition, the very long (soft) X-rays, because of low penetration may be especially effective in producing surface effects.

Although the treatment can be carried out using conventional X-ray equipment, the use of radioactive isotopes such as cobalt 60 is especially economical. Radiation from waste fission products, with particle irradiation screened off if desired, is also effective and offers an opportunity to utilize an otherwise useless waste product.

RADIATION DOSE

In determining the optimum dose of irradiation for any particular combination, both the nature of the organic compound and the nature of the solid substrate must be considered. For example, for vinyl monomers which are readily graftable, and polymer substrates that are readily activated by ionizing radiation, it appears that the greater part of the minimum irradiation dose is required to consume the inhibitor (including oxygen) which may be present in the vinyl monomer. After that is done, relatively low additional doses will produce enough radicals to initiate graft polymerization. For readily graftable combinations of this type, a high propagation constant is observed. Thus, the extent of irradiation-induced graft polymerization can be increased by increasing either radiation dose, post-irradiation time, post-irradiation temperature, or all three. For instance, if a polymer soaked in acrylic acid solution is irradiated with a dose of 0.06 mrad, and the irradiated sample is kept in contact with the acrylic acid solution for 1 hour at room temperature, a large amount of the acid is grafted. In contrast, with same dose, if monomer is removed from the sample immediately after irradiation (e.g., by a water extraction), only one-third as much acrylic acid is grafted. Therefore, for polymerizable vinyl compounds and readily graftable polymer substrates, a very small dose is required; thus, a minimum dose of 5000 rads (0.005 mrad) initiates a significant amount of grafting.

When unsaturated compounds which are not homopolymerizable (e.g., maleic acid) are used as the modifier, in combination with readily graftable substrates, doses of 0.1 mrad are required to initiate appreciable grafting. When non-polymerizable organic compounds or saturated polymeric modifiers are used, a minimum dose of 1 mrad should be employed. Radiation doses below the minimum specified fail to initiate beneficial amounts of grafting within a practical length of time. This is due to the fact that the life of free radicals produced by the irradiation depends on a balance between competing (i.e., non-grafting) reactions and those which produce grafting. It is obvious, of course, that even lower doses may be used in completely inhibitor- and oxygen-free systems, or if irradiation-initiation of grafting is supplemented by a chemical initiator.

Although the minimum doses specified are effective, higher dosages may be used and are usually highly beneficial. Dosages so high that substantial degradation of the shaped substrate occurs must obviously be avoided. High doses cross-link some polymers, which may sometimes be undesirable. In general, fibers produced from polyacrylonitrile and polyethylene may be irradiated to a dosage as high as 100 mrad. However, it is preferred that the dosage applied to these substrates not exceed about 50 mrad. Polyvinyl halide substrates generally should not be exposed to a dose greater than 25 mrad.

The distinction between "available irradiation" and "dose" should be recognized. The 2 mev. Van de Graaff electron accelerator used in many of the examples, operated as described, provides 12.5 watt seconds of irradiation per cm.$^2$ of substrate, per pass. For thin, organic polymer substrates (i.e., having a thickness of a few millimeters or less), the dose (energy absorbed) is about 1 mrad. Since much of the energy of the incident beam is not absorbed, several (fabric) samples may be irradiated simultaneously, each absorbing a dose of 1 mrad. Thicker substrates may absorb substantially all of the incident radiation energy, but the dose absorbed in the layers more distant from the electron source may not be sufficient to form a useful number of free radical sites.

REACTION CONDITIONS

Once free radicals are produced on the carbon atoms of the polymer chain in the presence of a vinyl monomer, vinyl polymerization is initiated, and polyvinyl chains grow from the initiating sites. However, it has been observed that the life of free radicals is many times greater than has been found in vinyl polymerizations carried out in solution or emulsions. For this reason, at a given radiation dose, the yield of polymer grafted to the shaped substrate is much greater than would be obtained, for example, if the substrate polymer were dissolved in the vinyl monomer and the solution irradiated.

The average molecular weight of the grafted polymer chains (at a given constant weight gain) may be controlled by adjusting the raidation dose. It may also be adjusted by controlling chain transfer to the substrate polymer, e.g., by changing grafting temperatures, or modifying the substrate polymer by incorporating copolymer components which are more (or less) susceptible to chain transfer. Similarly, the molecular weight distribution of the grafted polymer chains may be adjusted. By controlling the number, length and length distribution of grafted chains, the effect produced by a given grafting agent may be modified.

It has been observed that irradiation of the modifier-treated shaped substrate in the presence of air or moisture may occasionally cause some degradation; such adverse effects can be avoided by employing an atmosphere of inert gas around the article while it is being irradiated. Alternatively, a satisfactory and simpler approach is to wrap the sample in a material which is substantially air and water impervious, thus limiting the quantity of air or moisture contacting the sample. Complete exclusion of oxygen is not required, although it may contribute to grafting efficiency when using a vinyl monomer. In some of the examples, the samples are wrapped in polyethylene film. Aluminum foil is satisfactory. The nature of such wrapping material is not cirtical, provided it is substantially impervious to air and moisture, when required, and is readily penetrated by the radiation.

IRRADIATION CONDITIONS

It is within the scope of this invention to include in the combination to be irradiated, materials which may have a protective or antioxidant effect in preventing radiation degradation of either modifier or substrate or both. Compounds of this type are cysteine, carbon, polyethylene glycols and the like. It is also within the scope of this invention to include in the combination to be irradiated materials which absorb radiation and transmit the energy thus absorbed to the modifier or the organic polymeric material or both, whereby adhering is promoted and the efficiency of utilization of the radiation is increased. Compounds with this property are somewhat similar to sensitizers in photography, except that in this case useful materials absorb high energy radiation and emit the energy in a lower or more usable range. Phosphor screens containing calcium tungstate, zinc sulfide or metallic lead or the like have utility for this purpose. The phosphor materials may be used as plates contacting the material being treated, or may be incorporated in the modifying agent or even be coated on or dispersed in the organic polymeric material which it is desired to modify.

The irradiation may be accomplished over a wide range of temperatures. However, a low temperature decreases the tendency toward oxidation. Since the absorption of particle radiation frequently causes a temperature increase in the range of about 2° C. for each mrad absorbed, if high tube current is employed so that radiation absorption is complete within a short time interval, it is usually advisable to provide means to remove the heat generated to avoid injury to the sample. The use of Dry Ice to maintain a cold atmosphere is very satisfactory for this purpose. In general, irradiation at a higher temperature promotes the speed with which bonding occurs, thus promoting a higher throughput of a given piece of equipment at a constant radiation dosage. Temperatures ranging from −80° C. or below up to the melting point of the polymer substrate may be employed. More efficient grafting is often noted when irradiation temperatures are in the range of 100 to 160° C., as shown in Example 33. This is especially desirable for polyacrylonitrile substrate, which is preferably both soaked in the modifier and irradiated at tempratures of 80° C. or above.

In general, for the greatest weight of modifier grafted for a given dose, the organic compounds are applied to the substrate as liquids or solutions, the solutions being of relatively high concentration. Such procedure provides the maximum opportunity for the organic compound to be bombarded by the high energy particle. At times, the concentration of the organic compound on the substrate will noticeably affect the final properties.

Prior to treatment, the shaped article, such as a filament, may be oriented by hot or cold drawing. It may contain additives such as pigments, antioxidants, fillers, polymerization catalysts and the like. After the irradiation, the product may be after-treated. Frequently a certain amount of decomposition occurs at the surface which is readily removed by washing in detergent. In other after-treatments, the shaped article may be dyed, bleached, hot or cold drawn, chemically reacted, or given coatings of lubricants, sizes or the like or other similar treatments.

UTILITY

The process of the present invention is valuable in creating both surface and bulk effects upon shaped articles produced from synthetic organic addition polymers. It may be employed upon textiles to affect softness, resilience, tendency to shrink, static propensity, resistance to hole-melting, pilling, hydrophilicity, wickability, and the like. It is useful in changing such properties as tenacity, elongation, modulus, creep, compliance ratio, work recovery, tensile recovery, decay of stress, wet properties, high-temperature properties, abrasion and wear resistance, moisture regain, flex life, hydroyltic stability, heat-setting properties, boil-off shrinkage, dry-cleaning properties, heat stability, light durability, zero strength temperature, melting point, soilability, ease of soil removal, laundering properties, wash-wear properties, liveliness, crease resistance, crease recovery, torsional properties, hysteresis properties, fiber friction, dyeability, (depth, rate, permanence and uniformity), printability, washfastness of dyes or finishing treatments (resins, ultra-violet absorbers, etc.), handle and drape properties (stiffening or softening), heat-yellowing, snag resistance, elasticity, density, ease in textile processability, solubility (insolubilization or increase in solubility), bleachability, surface reactivity, delustering action, drying properties, fabric life, crimpability, stretchability, fabric stabilization, compressional resilience (rugs), thermal and electrical conductivity, transparency, light transmittance, air and water permeability, fabric comfort, felting, ion exchange properties, germicidal properties, adhesion, over-all appearance and combinations of these as well as others.

In addition to the above modifications which it may be desirable to effect in fibrous articles, there are other modifications which are particularly useful in other substrates, for example, in films. By way of illustration, polymeric films may be modified to improve adhesion to various coating or laminating agents which it may be desirable to adhere thereto, to change "slip" or the ease with which one film slides over another, to produce non-reflective or decorative coatings on film or sheet, to improve the ease of printing colors on such sheet and many other modifications such as will readily suggest themselves to one skilled in the art.

It is apparent that those properties which are not primarily a function of surface characteristics (e.g., tenacity, elongation, modulus, and the like) may be more conveniently modified by using modifiers which penetrate the polymeric substrate prior to irradiation-grafting, thus producing a graft copolymer extending throughout the penetrated volume. It is also apparent that at times it may be desirable to allow one or more modifiers to penetrate the substrate, and coat one or more modifiers on the surface of the polymer, then initiate grafting simultaneously by irradiating the shaped article.

The shaped article may be in the form of a woven or knitted fabric, fabricated articles for clothing or industrial use, a reinforcement for composite structures (such as cords for mechanical rubber goods, fiber or laminates, etc.), bristle or artificial straw, rod, bar, sheet, plate, laminate, and the like, as well as other forms of special shape.

Many other modifications will be apparent to those skilled in the art from a reading of the above description without a departure from the inventive concept.

We claim:

1. A process which comprises intimately contacting a solid preformed structure formed from an addition polymer with a fluid comprising an organic compound, the said fluid being substantially chemically inert to the said addition polymer and the said fluid being one in which the said addition polymer is substantially insoluble until the said organic compound has diffused to a substantial depth into the cross-sectional area of the said structure and thereafter subjecting the composition to ionizing radiation having an energy of at least about 50 electron volts wherein a radiation dosage is employed that is between about 5000 rad and that at which substantial degradation of the reactants occurs, thereby causing chemical adherence between the said addition polymer and the said organic compound.

2. The process of claim 1 wherein the ionizing radiation is electromagnetic radiation.

3. The process of claim 1 wherein the ionizing radiation is high energy particle radiation.

4. The process of claim 3 wherein the high energy particle is an electron.

5. The process of claim 1 wherein the synthetic addition polymer is a polymer of acrylonitrile.

6. The process of claim 1 wherein the said addition polymer is polyethylene.

7. The process of claim 1 wherein the organic compound is methoxydodecaethyleneoxymethacrylate.

8. The process of claim 1 in which the ionizing irradiation step is carried out at a temperature between about 100° C. and 160° C., but not above the melting point of the polymer substrate.

9. The process of claim 1 in which the substrate polymer contains a plasticizer.

10. The process of claim 1 in which the irradiation step is carried out in the presence of water.

11. The process of claim 1 wherein the organic compound contains an antioxidant.

12. A process for imparting improved adhesion characteristics to the surface of a shaped article made of a fluorocarbon polymer which comprises coating the surface of the shaped article with a polar organic compound and subsequently impinging an ionizing radiation at a dosage between about 5000 rad and that at which substantial degradation of the reactants occurs on the coated article.

13. The process of claim 12 in which the fluorocarbon polymer is polytetrafluoroethylene.

14. The process of claim 12 in which the fluorocarbon polymer is a copolymer of tetrafluoroethylene with hexafluoropropene.

15. A process for modifying the properties of a textile without destruction of its textile properties which comprises intimately contacting a textile structure, filamentary components of which are formed from an additional polymer, with a fluid comprising an organic textile modifying compound, the said fluid being one in which the said addition polymer is substantially insoluble and the said fluid being substantially chemically inert to the said addition polymer, removing the excess of the said fluid and thereafter subjecting the said textile to ionizing radiation having an energy of at least about 50 electron volts wherein a radiation dosage is employed that is between about 5000 rad and that at which substantial degradtion of the reactants occur, thereby causing chemical adherence between the said addition polymer and the said organic compound.

16. A process for the production of a graft copolymer, wherein a synthetic organic addition polymer comprises the backbone, which comprises contacting the surface of a shaped article of the said addition polymer with a fluid comprising an organic compound the said fluid being free of any compound capable of free-radical initiated self-polymerization, substantially chemically inert to the said addition polymer and thereafter subjecting the said shaped article bearing the said organic compound to bombardment by ionizing radiation having an energy of at least about 50 electron volts to provide a radiation dosage that is between about 5,000 rad and that at which substantial degradation of the reactants occurs, thereby causing chemical adherence between the said addition polymer and the said organic compound.

17. The process of claim 16 wherein the said addition polymer is a synthetic elastomer.

18. The process of claim 16 wherein the organic compound is a polyether.

19. The process of claim 16 wherein the organic compound is a polyoxyalkylene glycol.

20. The process of claim 16 wherein the organic compound is dodecafluoroheptyl alcohol.

References Cited by the Examiner

UNITED STATES PATENTS

| | | | |
|---|---|---|---|
| 2,668,133 | 2/54 | Brophy et al. | 204—154 |
| 2,670,483 | 3/54 | Brophy | 204—154 |
| 2,837,496 | 6/58 | Vandenberg | 260—45.5 |
| 2,841,569 | 7/58 | Rugg et al. | 260—45.5 |
| 2,849,419 | 8/58 | Hayes et al. | 260—45.5 |
| 2,863,812 | 12/58 | Graham | 204—154 |
| 2,878,174 | 3/59 | Rainer et al. | 204—154 |
| 2,940,869 | 6/60 | Graham | 117—1 |
| 2,955,953 | 10/60 | Graham. | |
| 2,999,056 | 9/61 | Tanner. | |

(Other references on following page)

OTHER REFERENCES

Ballantine et al.: Brookhaven National Laboratory Report No. 414, pages 1–14, October 1956.

Brookhaven National Laboratory Report No. 375, page 26, April 1956.

Chen et al.: "Journal Polymer Science," vol. 23, pages 903–913, February 1957.

Lawton et al.: "Nature," vol. 172, pages 76, 77, July 11, 1953.

Immergut et al.: Die Makromolekulare Chemie, 18/19, 322–341 (1956).

WILLIAM D. MARTIN, *Primary Examiner.*

DANIEL ARNOLD, RICHARD D. NEVIUS, JOHN R. SPECK, *Examiners.*